(12) United States Patent
Roberts et al.

(10) Patent No.: US 6,390,166 B1
(45) Date of Patent: May 21, 2002

(54) EXPANDABLE MANDREL HAVING ADJUSTABLE WIDTH

(75) Inventors: Clark A. Roberts; Mark S. Byerley, both of Greenback, TN (US)

(73) Assignee: WYKO, Inc., Greenback, TN (US)

( * ) Notice: Subject to any disclaimer, the term of this patent is extended or adjusted under 35 U.S.C. 154(b) by 0 days.

(21) Appl. No.: 09/574,362

(22) Filed: May 19, 2000

(51) Int. Cl.$^7$ .............................................. B29D 30/24
(52) U.S. Cl. ...................................... 156/415; 156/417
(58) Field of Search ............................... 156/414, 415, 156/417, 418, 419, 420

(56) References Cited

U.S. PATENT DOCUMENTS

| | | | |
|---|---|---|---|
| 3,405,023 A | * 10/1968 | Eckenwiler et al. | 156/415 |
| 3,948,717 A | * 4/1976 | Suzuki et al. | 156/415 |
| 4,210,482 A | * 7/1980 | Collins | 156/415 |
| 4,220,494 A | * 9/1980 | Kawaida et al. | 156/415 |
| 4,636,277 A | 1/1987 | Owen | |

\* cited by examiner

Primary Examiner—Geoffrey L. Knable

(74) Attorney, Agent, or Firm—Pitts & Brittian, P.C.

(57) ABSTRACT

A rotatable drum useful in the manufacture of vehicle tires. A plurality of segments collectively define the outer circumferential surface of the drum. These segments are divided into two sets, one set being disposed on each of the opposite sides of a transverse center plane of the drum, the center plane being oriented normal to the rotational axis of the drum. The two sets of segments are mounted for selective positioning thereof axially of the drum from a location external of the drum to adjust the overall working width of the drum. Further, the segments are selectively positionable between expanded positions radially of the rotational axis of the drum to provide a relatively continuous circumferential outer surface of the drum for the layup of a tire carcass thereon, and collapsed positions radially of the drum to permit the removal of a formed toroidal carcass from the drum. Movement of the plurality of segments of each of the two sets of segments radially of the rotational axis of the drum is effected by "slaving" the two sets of segments off a central mechanism which controls the radial positions of all the segments simultaneously and equidistantly from the rotational axis of the drum, while further providing for axial movement of the two sets of segments relative to one another while the segments are positioned at any given radial location of the segments.

11 Claims, 24 Drawing Sheets

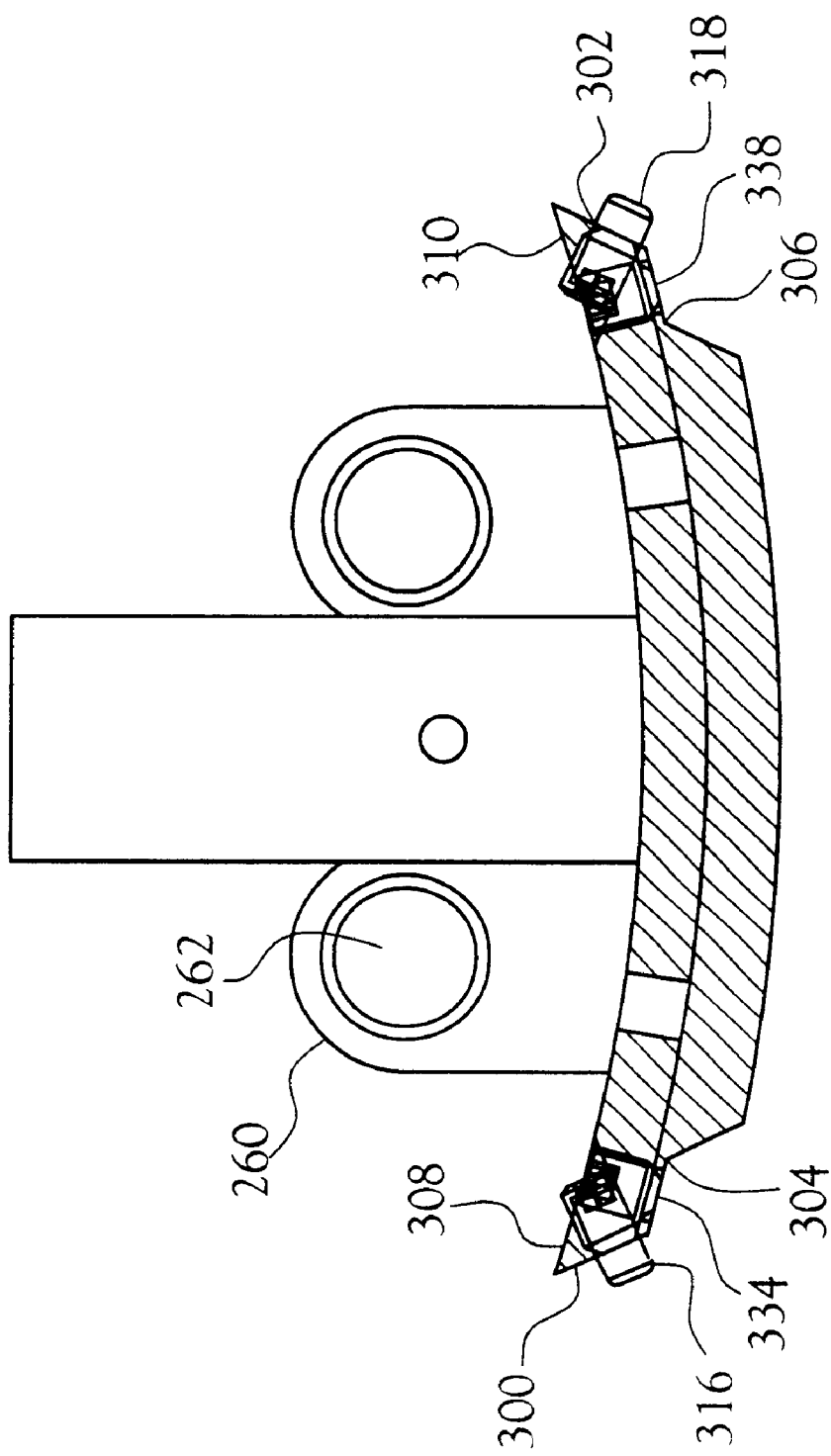

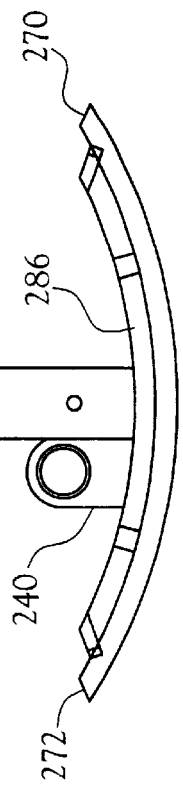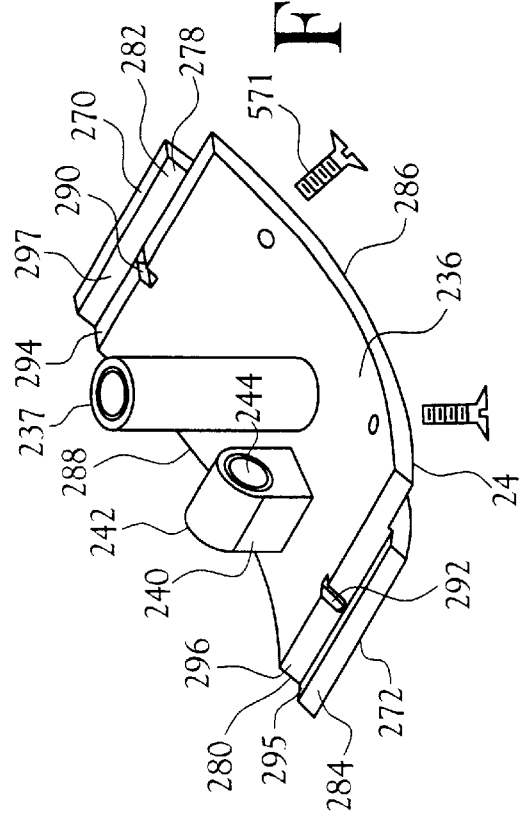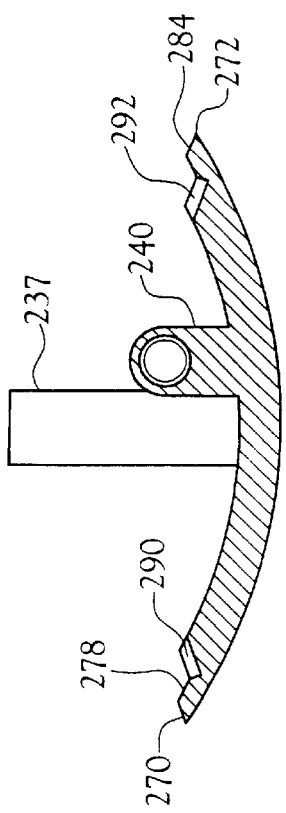

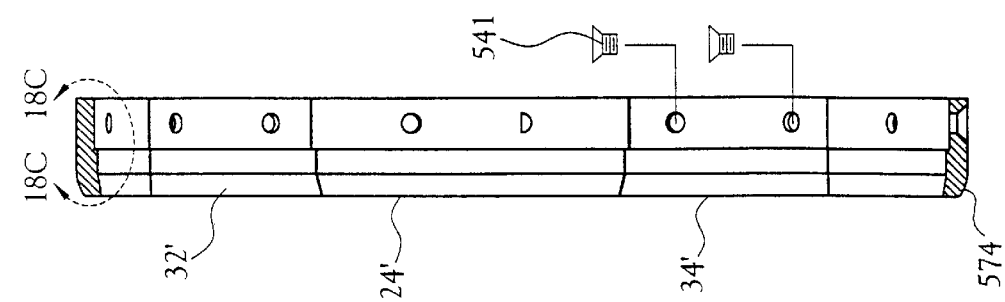
Fig.18B
Fig.18C
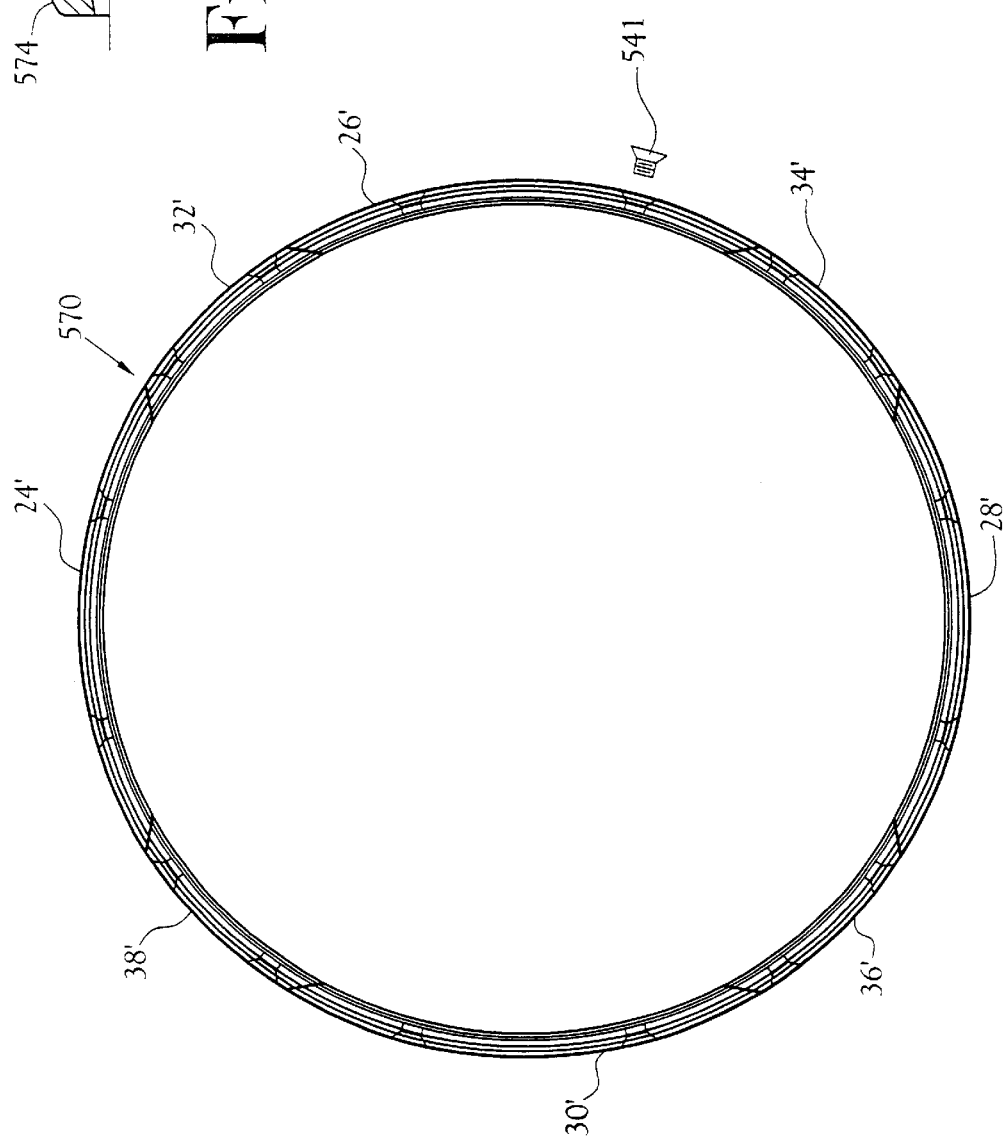
Fig.18A

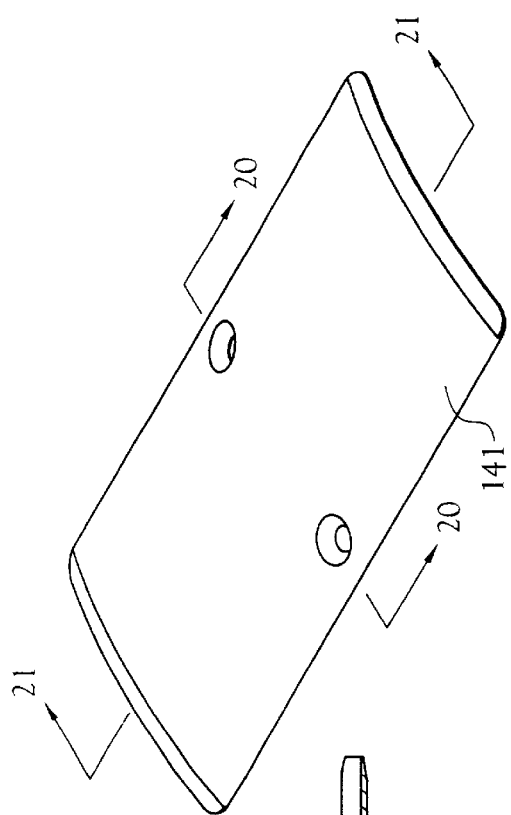
Fig.19
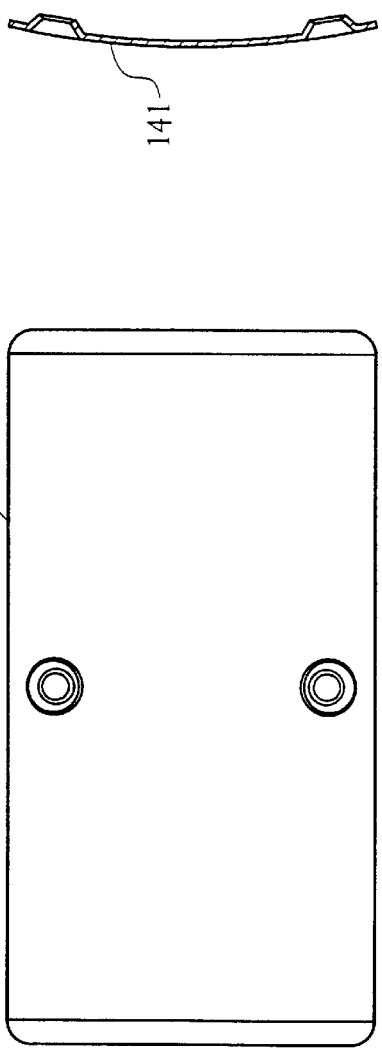
Fig.20
Fig.21
Fig.22

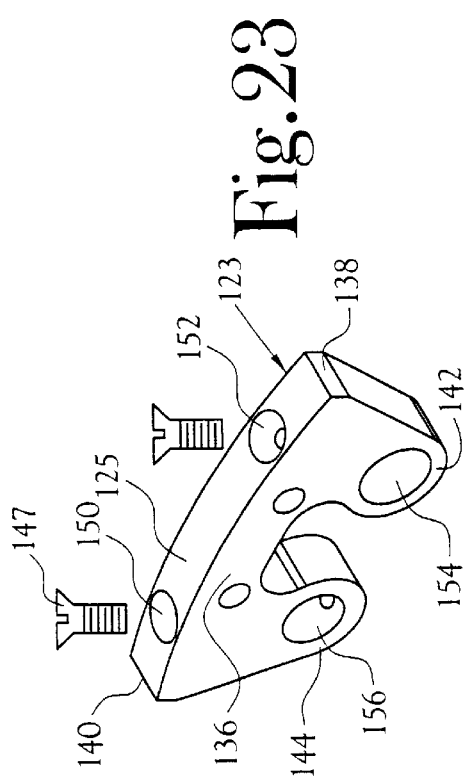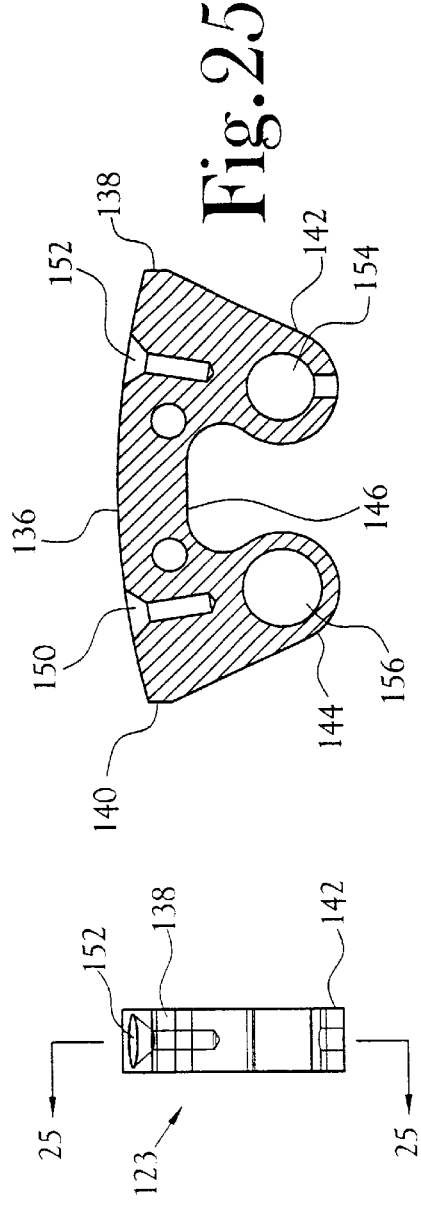

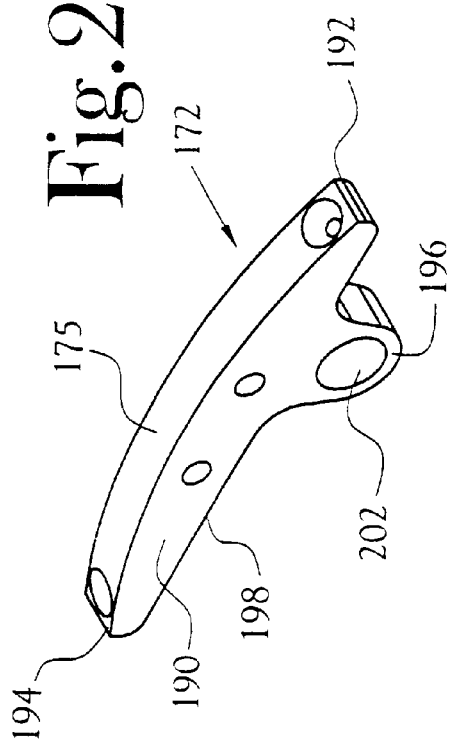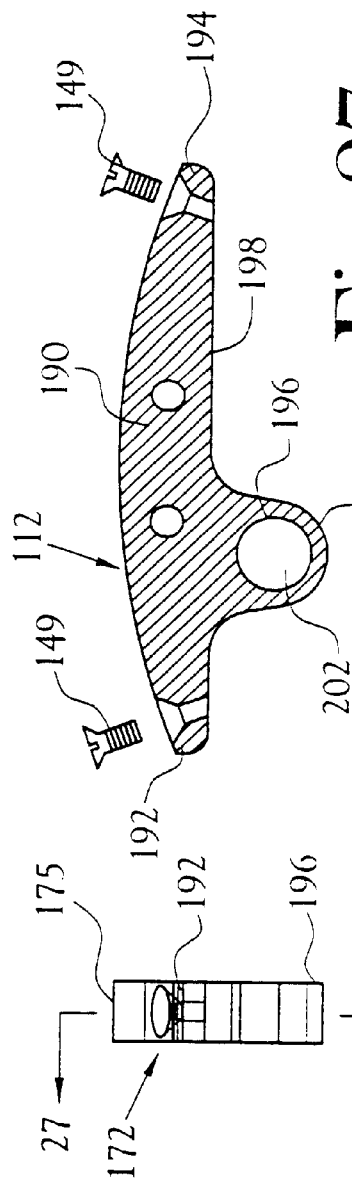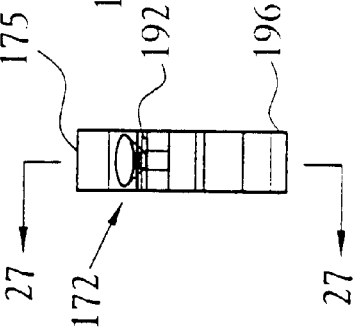

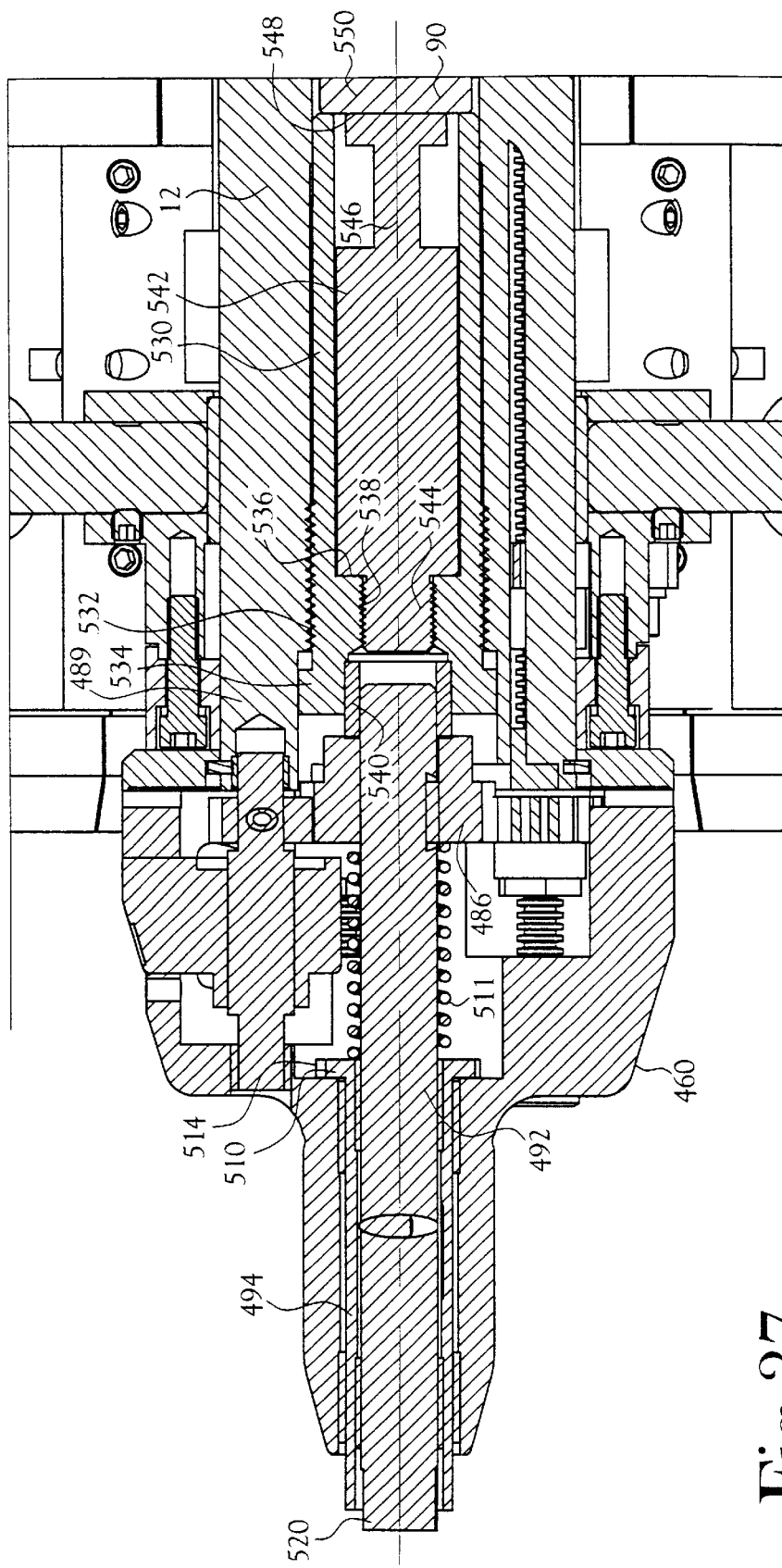

EXPANDABLE MANDREL HAVING ADJUSTABLE WIDTH

FIELD OF INVENTION

This invention relates to tire building drums and particularly to a drum which is adjustable in width for use in the manufacture of tires of different widths employing the same drum.

BACKGROUND OF THE INVENTION

In the manufacture of vehicle tires, it is common practice to build up the tire carcass from individual components which are overlaid onto the outer circumference of a rotatable drum. Removal of the formed tire carcass from the drum requires collapse of the diameter of the drum to an extent sufficient to allow the toroidal carcass to be removed from the drum. U.S. Pat. No. 4,636,277 (the "277 patent") discloses a tire building drum of this type. This prior art drum is also representative of prior art drums wherein any change in the width of the drum requires physical exchange of spaces between the outer shell segments which define the outer circumference of the drum to that size required for the manufacture of a given tire width size. This process is well known in the art to be cumbersome, time-consuming and expensive, and requires the keeping of an inventory of spacers.

Functionally, the drum of the "277 patent" requires special structure, and orientation of such structure, to successfully and repeated effect proper mating of the axially aligned side edges of adjacent ones of the segments to define a suitable working outer circumferential surface of the drum. Specifically, with reference to FIGS. 1 and 2 of the "277 patent", it will be noted that the inboard ends of alternating ones of the radial support structures 14 are mounted on the rotating hub 11 at respective locations which are offset from a radius drawn from the central axis of the drum through the center of the outboard end of a given radial support 14. These offset alignments of the radial support members permits the smaller segments to move radially inwardly of the drum in advance of the radially inward movement of the larger segments as is required to permit collapse of the segments toward the rotational axis of the drum. This mechanism further causes the larger segments to move radially outward of the drum in advance of the movement of the smaller segments radially outwardly of the drum when expanding the diameter of the drum. However, this mechanism causes the larger segments to move radially beyond their desired most radially outward positions and then to move radially inwardly to mate with the advancing smaller segments. Control over the precise mating of the larger and smaller segments at their desired outer limit of travel has proven to be difficult to control. As a consequence addition of an adjustable stop mechanism has been employed to improve the desired stop positions of the mating side edges of the larger and smaller segments. This stop mechanism, however, must be fixedly mounted, preferably welded, in place adjacent each of the opposite side edges of the smaller segments before assembly of the drum, and its stop limit adjusted after assembly of the drum. This mechanism provides only for a "single point" adjustment of the position of the side edge of a larger segment relative to a cantilevered extension of the smaller segment. Accordingly, this mechanism represents an undesirable added cost in time and constitutes a point of potential need for ongoing adjustment over the useful life of a drum.

It is therefore an object of the present invention to provide a tire building drum which is expansible in diameter and selectively changeable in both its diameter and its axial width without exchange of the outer segments that collectively define the outer circumferential surface of the drum or the use of spacers.

It is another object to provide a drum of the type described in which the adjustment of the width of the drum may be effected from a location external of the drum.

As is another object to provide a radially expansible tire building drum having improved control over the mating of its circumference-defining segments

BRIEF DESCRIPTION OF THE DRAWINGS

FIG. 13 is a side elevation view of the small segment depicted in FIG. 11;

FIG. 14 is a perspective view of a large segment of the drum depicted in FIG. 1;

FIG. 15 is a side elevation view of the large segment depicted in FIG. 14;

FIG. 16 is a sectional view of the large segment depicted in FIG. 14 and taken generally along the line 16—16 of FIG. 14;

FIG. 18A is a plan view of an end shell comprising individual end segments defining an outboard edge of each set of segments;

FIG. 18B is a sectional view of the end shell and taken generally along line 18B—18B of FIG. 18A;

FIG. 18C is a sectional view of an individual end segment taken generally along line 18C—18C of FIG. 18B;

FIG. 19 is a perspective view of a typical gap shield employed in the drum depicted in FIG. 1;

FIG. 20 is a sectional view of the gap shield depicted in FIG. 19 and taken generally along the line 20—20 of FIG. 19;

FIG. 21 is a further sectional view of the gap shield of FIG. 19 and taken generally along the line 21—21 of FIG. 19;

FIG. 22 is a top plan view of the gap shield depicted in FIG. 19;

FIG. 23 is a perspective view of a small segment connector bracket employed to mount a gap shield and alignment rods to which segments are mounted;

FIG. 24 is an end view of the bracket depicted in FIG. 23;

FIG. 25 is a sectional view taken generally centrally of and parallel to the length of the bracket depicted in FIG. 23;

FIG. 26 is a perspective view of a large segment connector bracket employed to mount a gap shield and an alignment rod to which large segments are mounted;

FIG. 27 is a sectional view taken generally centrally of and parallel to the length of the bracket depicted in FIG. 26;

FIG. 28 is an end view of the bracket depicted in FIG. 26;

SUMMARY OF INVENTION

In accordance with one aspect of the present invention there is provided a rotatable drum useful in the manufacture of vehicle tires. The drum includes a plurality of segments which collectively define the outer circumferential surface of the drum. These segments are divided into two sets, one set being disposed on each of the opposite sides of a transverse centerplane of the drum, the centerplane being oriented normal to the rotational axis of the drum. The two sets of segments are mounted for selective positioning thereof axially of the drum from a location external of the drum to adjust the overall working width of the drum. Further, the segments are selectively positionable between expanded positions radially of the rotational axis of the drum to provide a relatively continuous circumferential outer surface of the drum for the layup of a tire carcass thereon, and collapsed positions radially of the drum to permit the removal of a formed toroidal carcass from the drum. Movement of the plurality of segments of each of the two sets of segments radially of the rotational axis of the drum is effected by "slaving" the two sets of segments off a central mechanism which controls the radial positions of all the segments simultaneously and equidistant from the rotational axis of the drum, while further providing for axial movement of the two sets of segments relative to one another. This central mechanism further provides for mounting and radial movement of a plurality of gap shields which are disposed about the central portion of the outer circumferential surface of the drum.

In the present drum, the axial and radial movements of the divided sets of segments are accomplished by unique mechanisms which provide for both selective and coordinated movements of the segments from locations external of the drum. These mechanisms include multiple lead screws which are disposed externally of the central main shaft of the drum and which are actuated simultaneously from a single location external of the drum to effect adjustment of the width of the drum, with disengagement of the lead screws from the external source of their adjustment once the width of the drum is selectively established, thereby ensuring "locking" of the drum width against unintended change thereof.

In accordance with another aspect of the present drum, there is provided means for mutual adjustment of the most radially outward "working" positions of the circumference defining segments of the drum.

DETAILED DESCRIPTION OF INVENTION

Figures 11, 12:
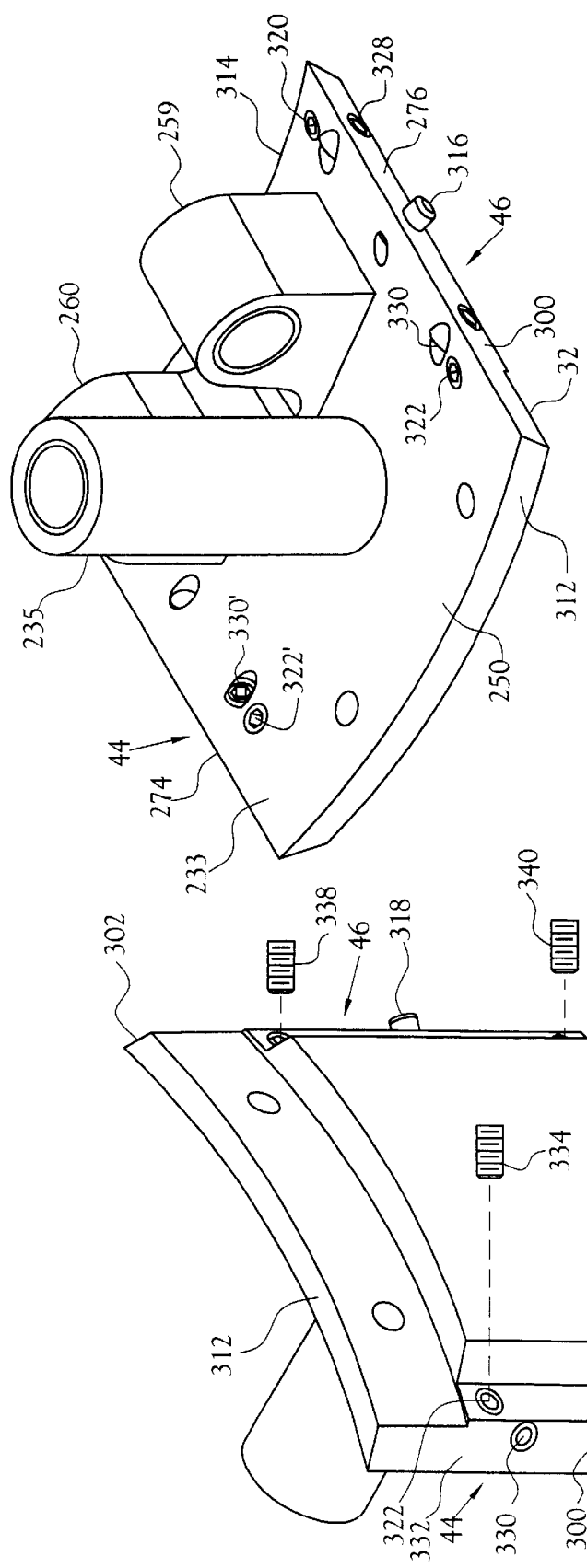
FIG. 11 is a perspective view of a small segment of the drum depicted in FIG. 1.
FIG. 12 is a further perspective view of the small segment depicted in FIG. 11.

As depicted in FIGS. 1–5, a drum 10 in accordance with the present invention includes a main shaft 12 which extends through the width of the drum and defines the rotational axis 14 of the drum. The outer circumferential surface 16 of the drum is defined by first and second sets of segments, indicated generally by the numerals 18 and 20. In the depicted drum, each set of segments includes four large segments 24, 26, 28, and 30 (larger in width) and four small segments 32, 34, 36 and 38. The corresponding large and small segments of the second set of segments are identified by primed numerals. Within each set, the larger and smaller segments alternate in their position about the circumference of the drum. The first set 18 of the large and small segments is disposed outboard of the drum and the second set 20 is disposed inboard of the drum. These sets of segments are mounted for simultaneous axial movement toward and away from one another. The circumferential space between the sets of segments at the transverse center plane 19 of the drum is closed by conventional associated small and large gap shields 22 and 23, respectively (typical) (see also FIGS. 11,14 and 18).

Referring specifically to FIGS. 11–17, the side edges 40,42 and 44,46 of each segment are chamfered suitably to permit proper engagement of the respective side edges of alternating segments with their neighbor segments to define a substantially continuous outer circumferential surface 16 of the drum.

Figure 1:
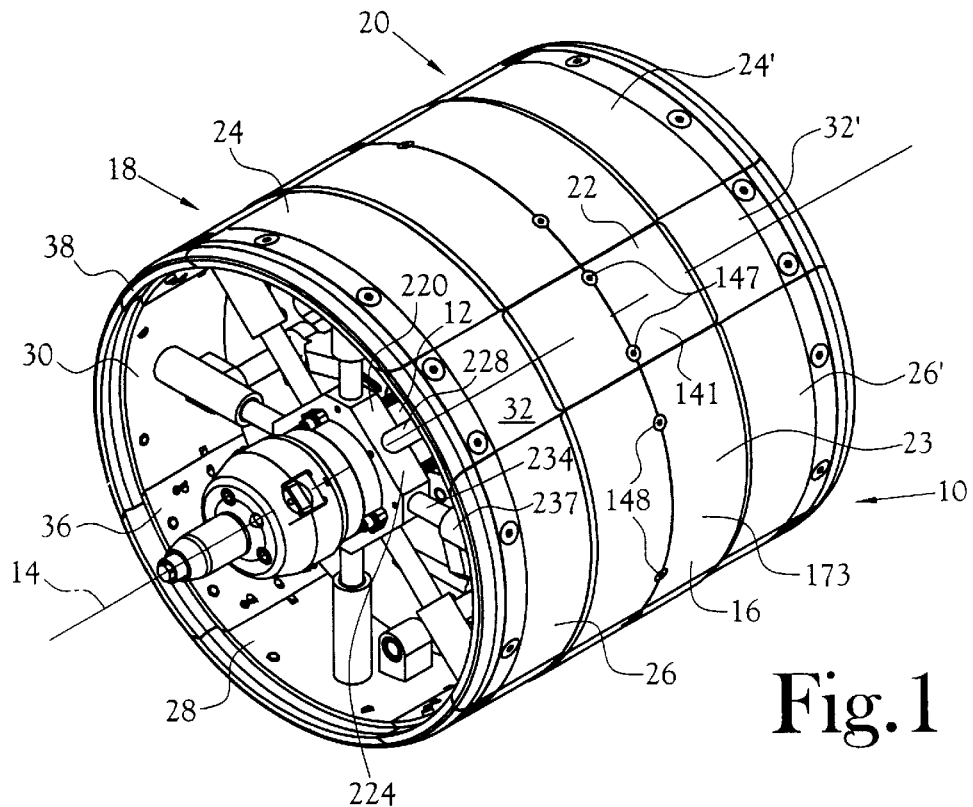
FIG. 1 is a perspective view of a drum embodying various of the features of the present invention.

With reference to FIGS. 1 and 18A,–18C, in the depicted embodiment of the present drum, each of the opposite ends of the drum is fitted with a segmented ring 570 which defines the outermost edges of the outer circumference of the drum. Specifically, the segmented ring of the depicted drum includes four segments 24', 26', 28' and 30' which correspond to the four large segments 24, 26, 28 and 30 of the drum, and four segments 32',34', 36' and 38' which correspond to the four small segments 32, 34, 36, and 38 of the drum, each segment effectively serving as an extension of its respective large or small segment. Each extension segment is mounted to the outboard end of its associated large or small segment, as by screws 571 (typical), for positioning with such associated large or small segment.

Each end segment includes a chamfered outermost edge 574. This feature provides for more uniform and less stressful relative movement between the outermost edges of the drum and the tire fabric carcass which has been overlaid on the drum, as the carcass is expanded in the course of forming of the sidewalls of the carcass. Moreover, the cross-sectional curvature of the chamfered outermost edge of the end segments may be chosen to accommodate different desired tire geometries.

Figure 6:
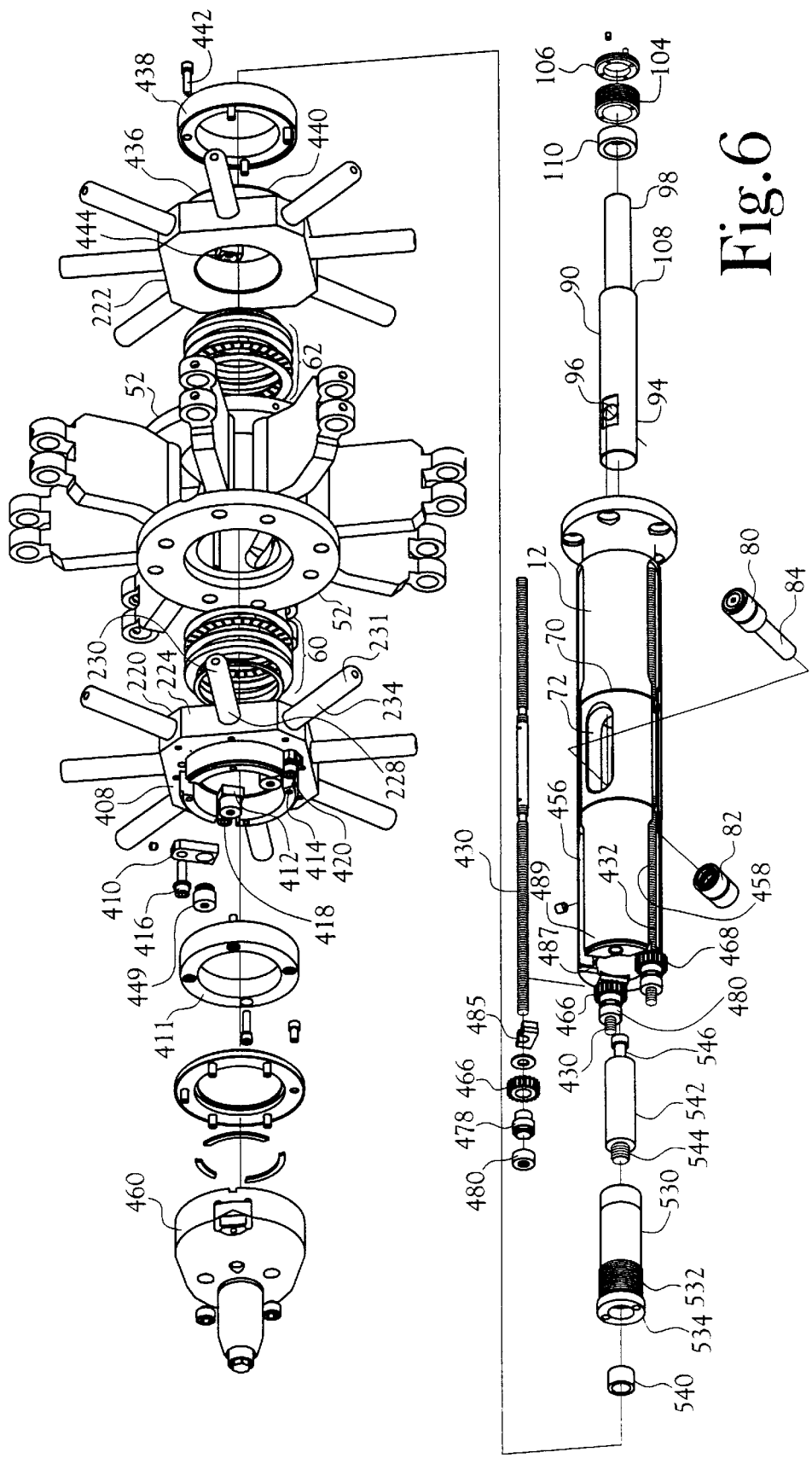
FIG. 6 is an exploded view of various of the internal working elements of the drum depicted in FIG. 1.
Figure 7:
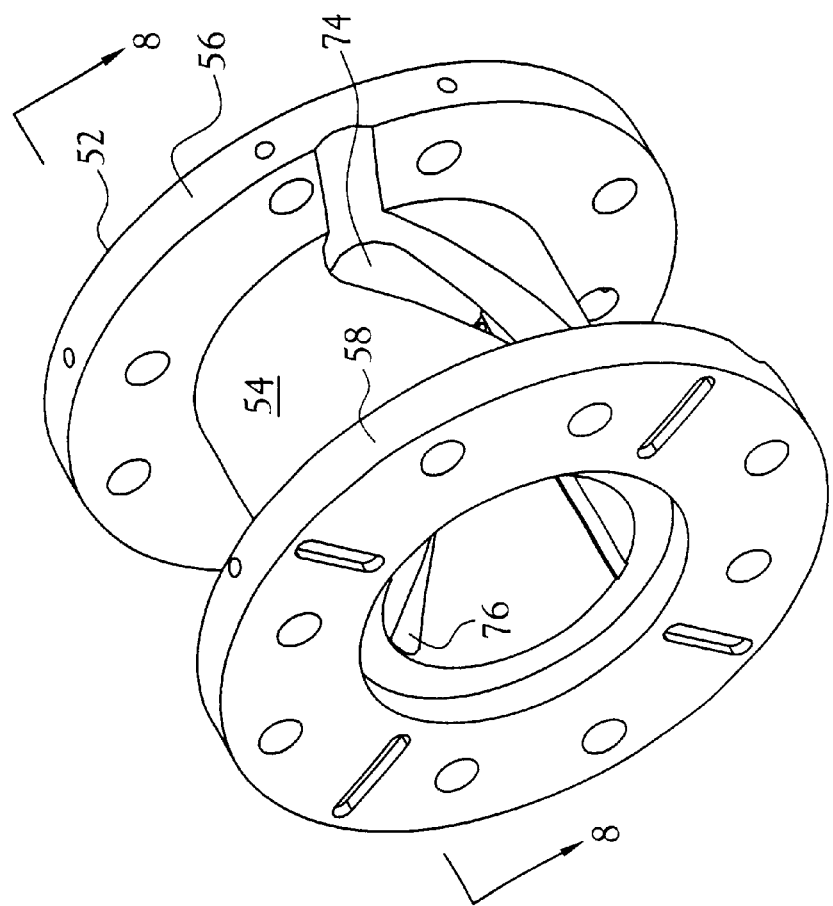
FIG. 7 is a perspective view of a hub element of the drum depicted in FIG. 1.
Figure 8:
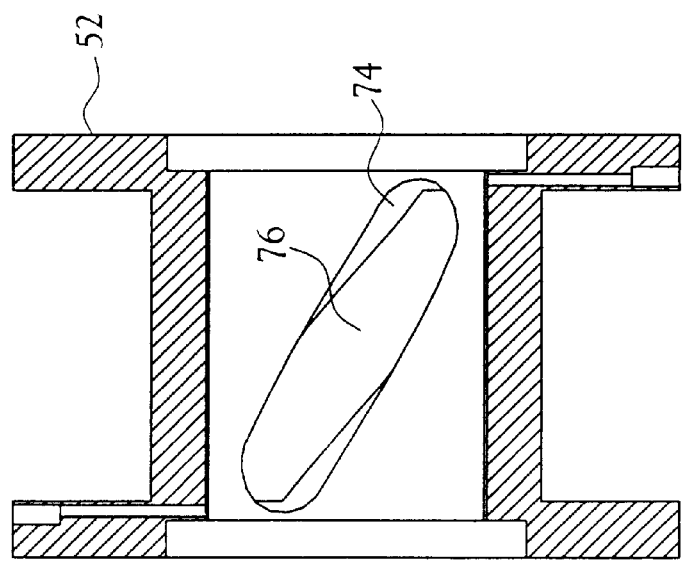
FIG. 8 is a sectional view of the hub element of FIG. 7 and taken generally along the line 8—8 of FIG. 7.

Referring to the several Figures and specifically to FIGS. 3,4 and 6–8, within the interior of the drum, the main shaft 12 is fitted with an encircling spool-shaped hub 52 which includes a hollow cylindrical central body portion 54 and opposite end radial flanges 56 and 58. This hub is rotatable about the main shaft but is restrained against axial movement relative to the shaft as by first and second retainer subassemblies 60,62. Each depicted subassembly includes a ring gasket 64, a collar 66 and a split ring 68 which engages a circumferential slot 70 in the main shaft. As depicted in FIG. 6, the main shaft 12 is provided with a through slot 72 at a location generally centrally of its length and which is aligned with the hub 52. The depicted hub is provided with a pair of helical slots 74,76 through the wall thickness of its central body portion 54. First and second roller cams 80 and 82 mounted on opposite ends of a shaft 84 are slidably mounted within the through slot 72 in the main shaft and project from the main shaft to reside within respective ones of the helical slots 74,76 provided in the wall of the hub 52. Thus it will be recognized that axial movement of the roller cams 80,82 will effect rotational movement of the hub 52, either clockwise or counterclockwise rotation, depending upon the direction of axial movement of the roller cams within the main shaft.

Figure 3:
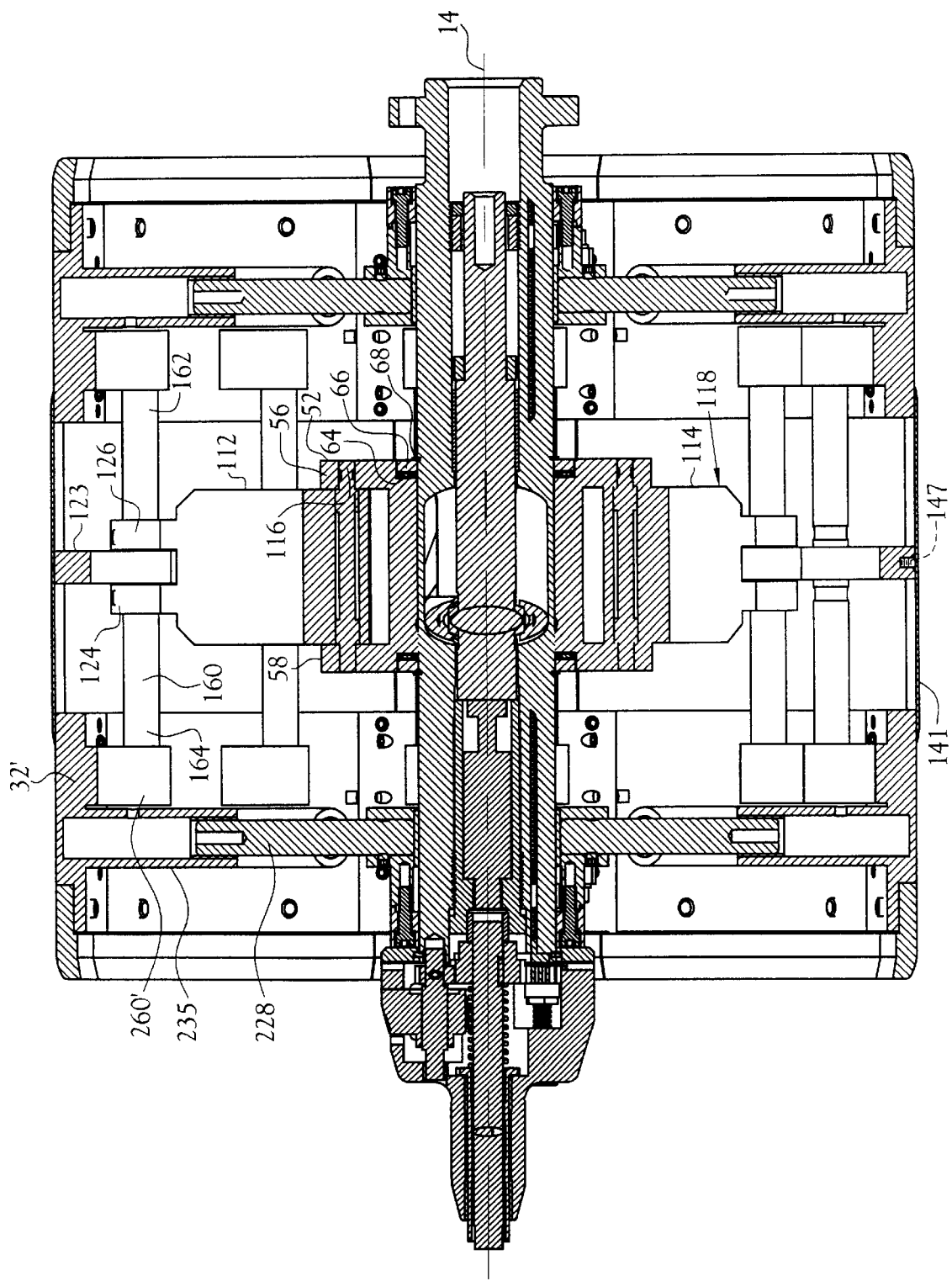
FIG. 3 is a sectional view taken generally along the line 3—3 of the drum depicted in FIG. 2.
Figure 4:
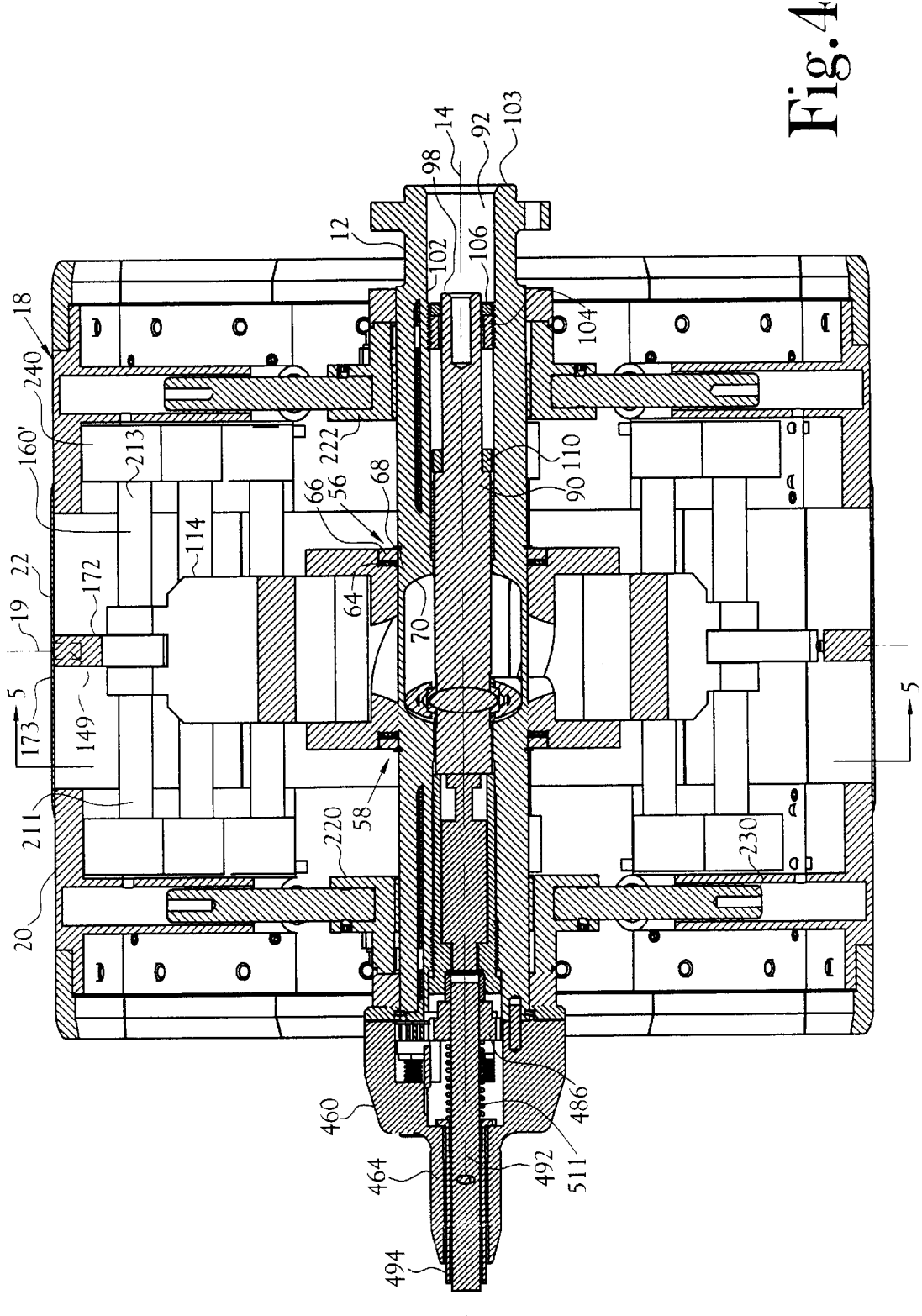
FIG. 4 is a sectional view taken generally along line 4—4 of the drum depicted in FIG. 2.
Figure 5:
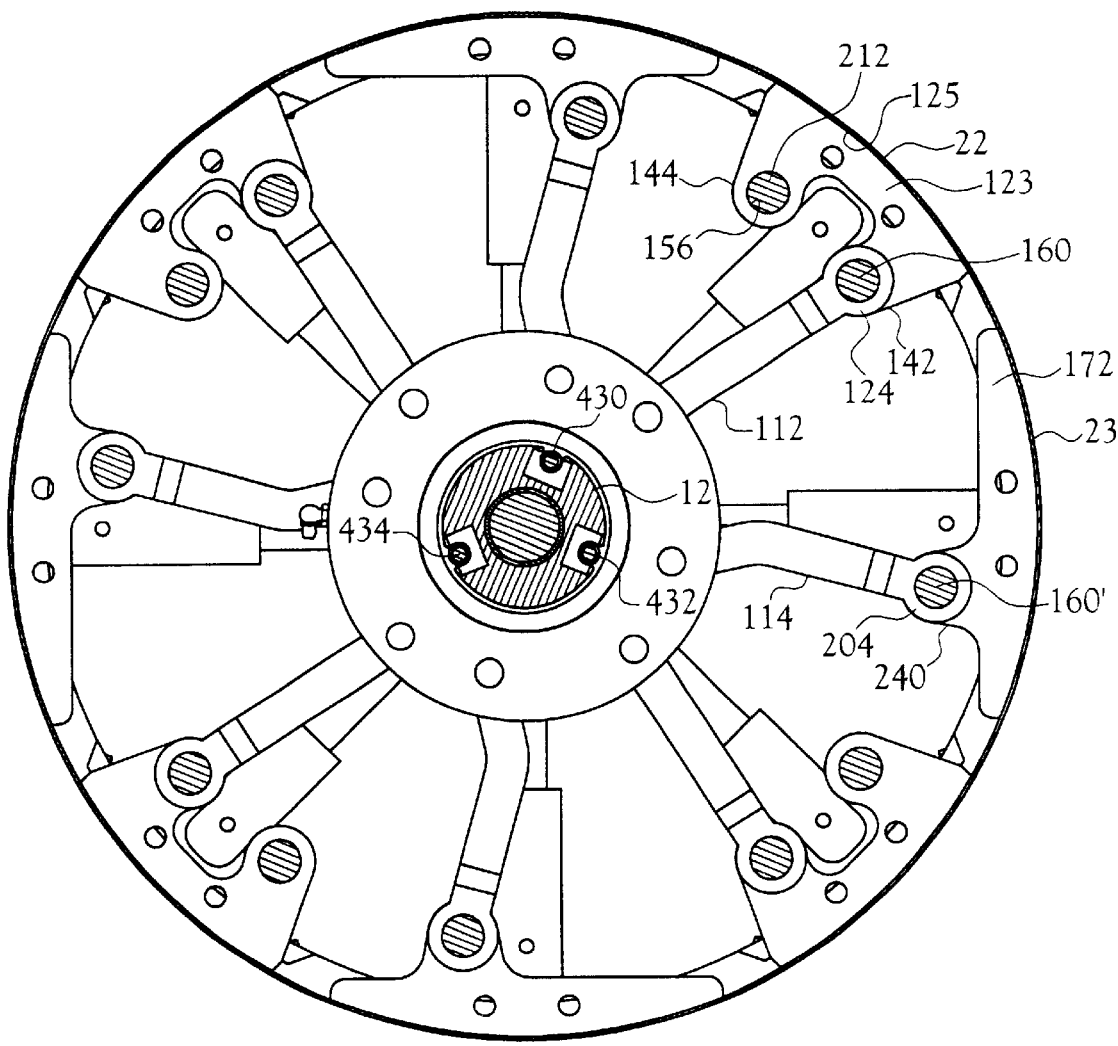
FIG. 5 is a sectional view taken generally along line 5—5 of FIG. 4.

Control of the axial movement of the roller cams 80,82 is provided for by means of a drive rod 90 which is mounted within the hollow central cavity 92 of the main shaft 12 for axial sliding movement relative to the main shaft (see FIGS. 3,4, and 6). Adjacent the inboard end 94 of the rod 90 there is provided a through bore 96 within which there is received the shaft 84 which mounts the roller cams 80,82. The position of the outboard end 98 of the rod is stabilized within the main shaft. To this end, the interior wall 102 of the main shaft is threaded adjacent the outboard end 103 thereof to threadably receive an outside threaded spanner nut 104 and a lock nut 106 to rotatably position the outboard end 98 of the rod centrally within the hollow interior cavity of the main shaft. The outboard end of the rod is bored and tapped to be engaged with an actuating mechanism associated with the tire making machine proper (not shown), as is known in the art. This known actuating mechanism functions to selectively move the drive rod 90 axially within the main shaft to thereby effect resultant rotational movement of the hub 52, hence effect radial adjustment of the segments and selection of the diameter (circumference) of the drum.

In accordance with one aspect of the present invention, the drive rod 90 is provided with a radial shoulder 108 at a location approximately one-third the length of the rod as measured from the outboard end thereof. Adjacent this shoulder there is provided a shock-absorbing ring 110 which encircles the drive rod and abuts the shoulder 108. This ring may be of a urethane or like material having a Shore durometer of about 80. Upon withdrawal of the drive rod axially toward the right as viewed in FIGS. 3 and 4, the spanner nut 104 acts as a stop to limit such axial movement of the drive rod when the shock-absorbing ring 110 engages the spanner nut. The present shock-absorbing ring provides both noise reduction and reduction of mechanical failure of the drive rod in the course of its functioning to radially expand and collapse the diameter of the segments of the drum.

Figure 9:
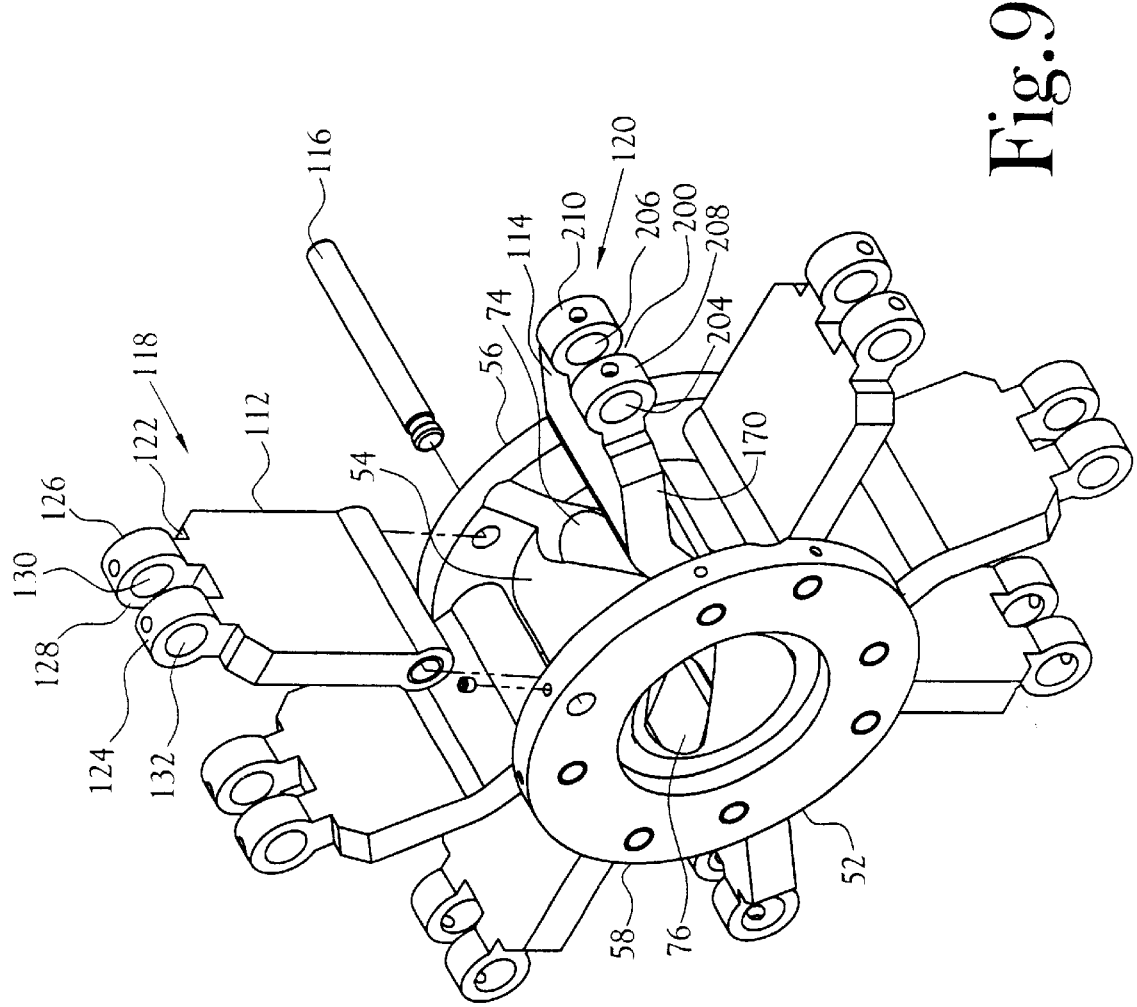
FIG. 9 is a perspective view of the hub element of FIG. 7 and transition elements associated therewith.
Figure 10:
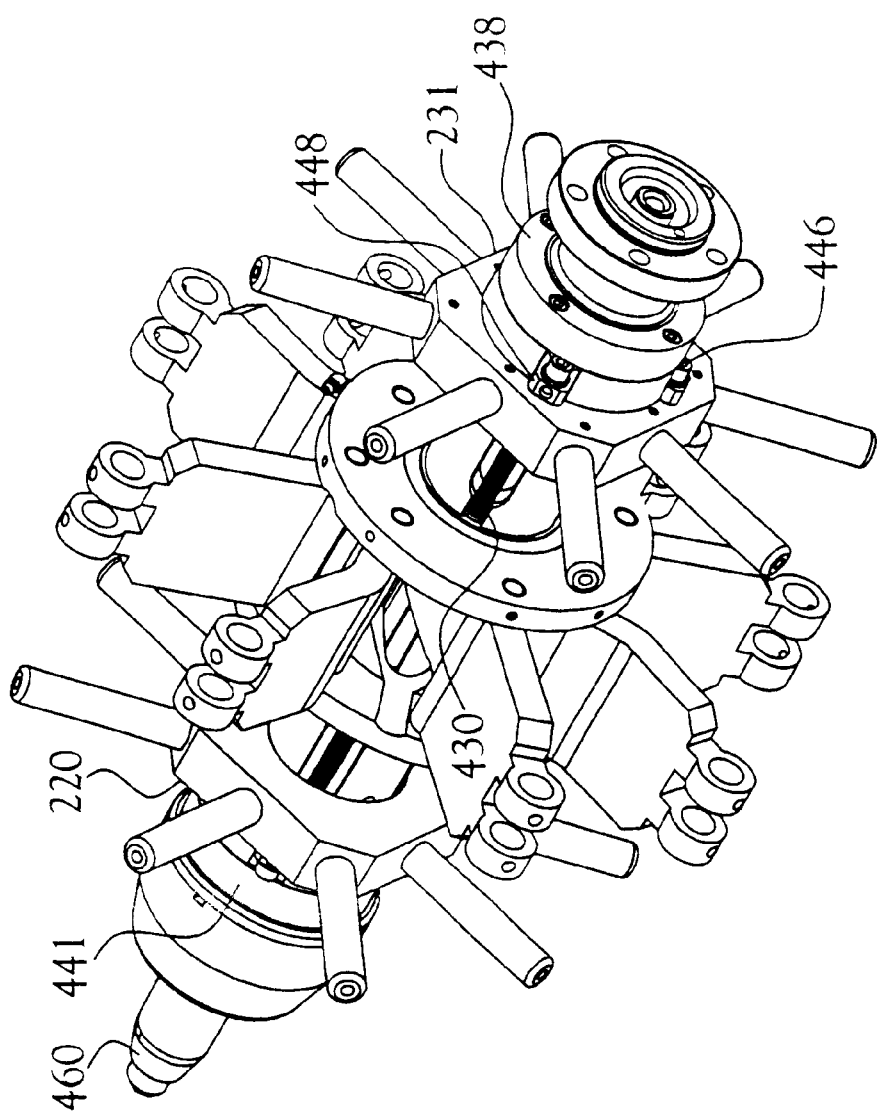
FIG. 10 is a perspective view of various assembled internal working elements of the drum depicted in FIG. 1.

Within the interior of the drum, the hub 52 is fitted with a plurality of transition brackets 112,114 for mounting the segments and gap shields to the hub (see FIGS. 6,9 and 10). Each transition bracket, bracket 112, for example, is pivotally mounted between the opposite radial flanges 56,58 of the hub 52 as by a respective pivot pin 116. It is to be noted that the transition brackets comprise first and second sets, each transition bracket of a set having the same geometric configuration. Specifically, the transition brackets 112 of the first set 118 are substantially flat and planar intermediate their respective opposite ends and the transition brackets of the second set 120 are planar but include a bend disposed intermediate their respective opposite ends. The transition brackets of the first set 118 serve to mount the small segments to the hub, while the brackets of the second set 120 serve to mount the large segments to the drum. The bend in transition brackets 114 provide for nesting of the several transition brackets when the segments of the drum are in their collapsed attitude.

As depicted in FIG. 9, the outboard end 122 of each transition bracket 112 of set 118 is provided with first and second lugs 124,126 (typical) which project radially outwardly from the end of the transition bracket and are spaced apart from one another to define an open space 128 therebetween. Each lug is provided with a respective through bore 130,132 through its thickness, with these through bores being in axial register with one another.

On the outboard end 122 of each of the several transition brackets 112 of the first set 118 there is pivotally mounted a first connector bracket 123 (see FIGS. 5 and 23–25) which includes an elongated generally arcuate body portion 136, opposite end portions 138,140 and first and second lugs 142,144 which project from the inner surface 146 of the body portion. The transition brackets 112 of the first set 118 thereof and their accompanying connector brackets 123 serve to mount the small segments 32, 32' (typical) and the gap shields associated with the small segments to the hub. To this end, in the depicted embodiment, a respective gap shield 22 is secured to the outboard surface 125 of each first connector bracket as by screws 147 (typical) which are received in threaded bores 150,152 in the body portion of each connector bracket.

Each of the lugs 142,144 is provided with a respective through bore 154,156. For purposes which will appear hereinafter, the respective through bores of the first and second lugs are aligned axially of the drum, ie., parallel to the rotational axis 14 of the drum.

One of the lugs, lug 142 for example, of each of the first connector brackets 123 projects radially inwardly from the body portion of the connector bracket and is dimensioned to be received within the open space 128 defined between the first and second lugs 124 and 126 on the outboard end of a respective transition bracket 112 and with its through bore 154 in register with the registered through bores 124,126 of the first and second lugs of the transition bracket. Pin means 160 is provided within these registered through bores to pivotally mount the connector bracket to its respective transition bracket. For purposes which will appear hereinafter, the pin 160 extends axially from the connector bracket 112 to provide opposite cantilevered ends 162,164. Each of the ends 162,164 of the pin 160 extend to approximately its respective end of the drum as best seen in FIG. 3.

On the outboard end 170 of each of the transition brackets 114 of the second set 120 of transition brackets 114 there is pivotally mounted a second connector bracket 172. The transition brackets of this second set 120 and their accompanying connector brackets 172 serve to mount the large segments and the gap shields 23 associated with the large segments, to the hub. To this end, in the depicted embodiment, a respective gap shield 23 is secured to the outboard surface 175 of each second connector bracket as by screws 149 (typical).

Each of the transition brackets 114 of the second set of transition brackets 120 includes an elongated generally arcuate body portion 190 having opposite ends 192 and 194. A mounting lug 196 is provided on the radially inward surface 198 of each of the second transition brackets 114 and projects therefrom and is configured to be received within the open space 200 defined between the first and second outboard end lugs 208,210 of its respective transition bracket 114. This mounting lug 196 is provided with a through bore 202 extending through its thickness, this through bore being in register with the through bores 204, 206 of the lugs 208,210 of its respective transition bracket 114, for example. These registered bores are pivotally connected as by a first guide pin 160' to pivotally mount each of the transition brackets of the second set of transition brackets with their respective connector brackets and large segments and associated gap shields. As depicted, this guide pin 160' is of a length such that its opposite ends 211,213 extend axially from opposite sides of, and beyond, the transverse center plane 19 of the drum to terminate at respective locations adjacent the opposite ends of the drum as best seen in FIG. 4.

In accordance with one aspect of the present invention, a second guide pin is received within the through bore 156 of the first lug 144 of the connector bracket 123. This pin also is of a length such that its opposite ends extend axially from opposite sides of, and beyond, the transverse center plane 19 of the drum to terminate at respective locations adjacent the opposite ends of the drum. Notably, the first and further pins 160,212 are aligned parallel to one another, but spaced apart from one another and serve to maintain the alignment of the left-hand and right-hand ones of the small segments of each of the sets 18 and 20 of segments. In the depicted embodiment only the small segments are interconnected by two guide pins inasmuch as the larger segments are not prone to deleterious misalignment between the left-hand and right-hand sets of large segments.

Figure 29:
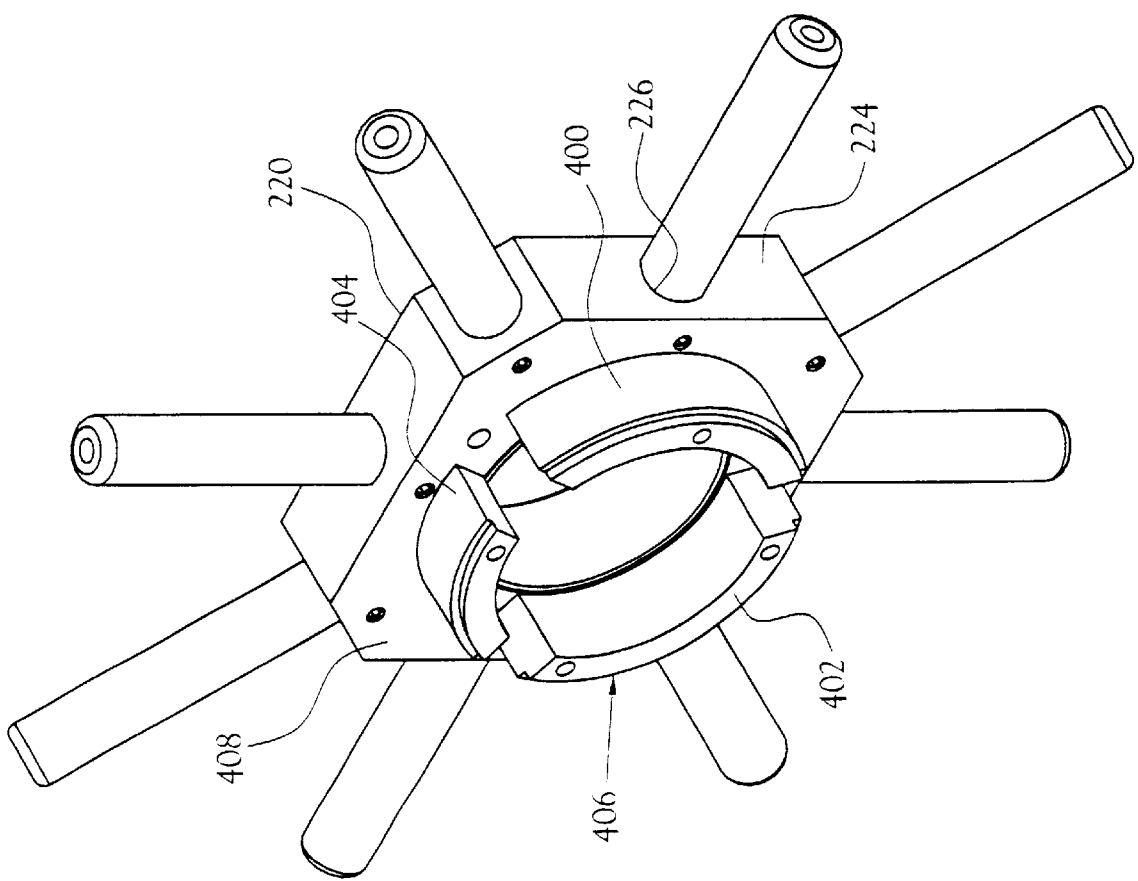
FIG. 29 is a perspective view of a collar assembly employed in the mounting of segments to the main shaft of the drum depicted in FIG. 1.
Figure 30:
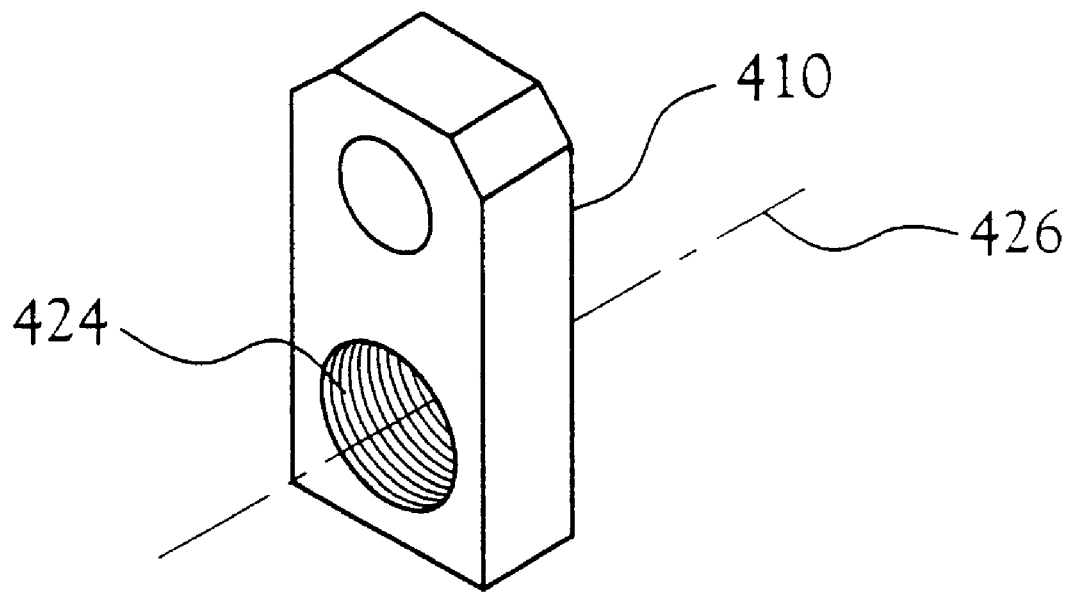
FIG. 30 is a perspective view of a mounting block employed for mounting lead screws in the drum of the present invention.

Referring specifically to FIGS. 1–4 and 6, in the depicted drum, the large and small segments of each of the first and second sets of segments are mounted for radial movement toward and away from the main shaft 12. Each set of segments is provided with a respective first and second collars 220 and 222, each of which encircles and is non-axially and non-rotatably mounted on the main shaft. The depicted first collar 220 is provided with eight sides (as viewed in FIG. 29). The second collar 222 is a mirror image of the first collar. Each side surface 224, for example, of the collar is bored 226 and receives therein a rod 228,234 which projects radially outwardly from its respective side of the collar. As depicted in FIG. 6, the outboard end 230,231 of each of the rods 228,234 slidably receives thereover a hollow tubular projection 235,237 which is mounted on the inner surface 234,236 of each of the small and large segments 32,24, respectively, (typical) of a given set of segments and which projects radially inwardly of the drum. By this means, each segment is secured in its desired position relative to the main shaft and relative to its neighbor segments, while providing for radial movement of the plurality of segments during collapse or expansion of the outer circumference of the drum.

Further, on the inner surface 236 of each of the large segments 24 (typical) of each of the first and second sets of segments, there is provided a lug 240 which projects from the segment radially inwardly of the drum when the segment is mounted on the drum. The outboard end 242 of each such lug on a given large segment is provided with a through bore 244 whose axis is in register with the axis of the through bore 202 in the lug 196 on that connector bracket 172 which is associated with the given large segment. Thus, the outboard end 213 of the alignment rod 160 is slidably received within the through bore 244 of the lug 240. The width dimension of the lug 240, hence the length of its through bore, and the sliding fit of the alignment rod 160 with this through bore are chosen to ensure minimal torqueing or warping of the given large segment in any direction relative to the axis of the through bore 244.

Whereas the mounting of only one large segment of the first set of segments has been described, it will be recognized that each large segment of each of the first and second sets of segments is substantially likewise mounted relative to the main shaft.

As described, each large segment of the drum is slidably mounted for movement axially along its respective end of its respective alignment rod 160. In the depicted embodiment, only one alignment rod 160' is associated with each large segment 24 of a set of segments. The opposite end 242 of this same rod is associated with the corresponding large segment of the second set of segments.

In the depicted drum, each of the small segments of each of the first and second sets of segments includes an arcuate body portion 250 and a first mounting lug 259 projecting radially inwardly of the rum. This lug 259 is provided with a through bore 261 which is dimensioned to snugly slidably received therein one outboard end 162 (for example) of the alignment rod 160. As noted hereinabove, a hollow tubular projection 235 projects radially inwardly from the inner surface 233 of the small segment to slidably receive therein the outboard end of one of the rods 228, for example, which extends radially outwardly from the collar 220. Thus, the mounting of the small segments of each set is substantially like the mounting of the large segments of each set of segments. As also noted hereinabove, for purposes of enhanced rigidity of alignment of the small segments relative to the rotational axis of the drum and relative to each other and their neighboring segments, each small segment is provided with a further lug 260 on the inner circumference of the segment and which is spaced circumferentially apart from the first lug 259 on the segment. This further lug is substantially identical to the first lug and is provided with a like through bore 262 whose axis is aligned parallel to the main shaft and parallel to the axis of the through bore 261 of the first lug 259. This through bore 262 of the further lug 260 of a given small segment slidably receives therein one end of the pin 212 which is mounted in the lug 144 on that connector bracket 123 which is associated with the transition bracket 112 for the given small segment. The corresponding small segment 32, for example, of the second set 20 of segments is likewise provided with a further lug 260' which includes a through bore in its radially inward end and which slidably receives therein the opposite end 164 of the rod 212. By this means, each small segment of each set of segments is stabilized with respect to its associated transition bracket, hence with respect to the alignment of the small segments with the main shaft of the drum.

Inasmuch as the alignment of the large and small segments is maintained mechanically, the alignment is retained at all radial positions of each of the large and small segments irrespective of the radial positions of the segments at any given time and within their respective limits of travel. Further, through the means of the plurality of alignment rods whose opposite ends extend axially from their anchored central portion, in opposite directions from the transverse center plane of the drum to slidably receive respective small segments thereon, each of the small segments is retained in precise alignment with the main shaft (parallelism with the main shaft over their limits of axial travel; circumferential relationship to the main shaft, hence precise positioning of all of the segments as they are brought into mating relationship for defining the outer circumferential surface of the drum). Further the alignment rods 160 provide support and guidance as the first and second sets of segments are adjusted axially of the transverse centerplane of the drum to selectively adjust the width of the drum. In this manner, the two sets of segments are "slaved" off the central control mechanism. That is, the segments of each set of segments are indirectly connected (through the rods 160) to the central control mechanism.

With specific reference to FIGS. 14–16, it will be noted that each of the large segments of each set of segments, segment 24, for example, includes opposite side edges 270 and 272 which are oriented parallel to the rotational axis 14 of the drum when the segment is mounted on the drum. In like manner, each of the small segments, segment 32, for example, includes opposite side edges 274 and 276 which are also oriented parallel to the rotational axis of the drum. When the drum is expanded to its designed maximum diameter, one of the side edges 270,272 of each large segment 24 matingly engages a side edge 274,276 of each of its respective neighboring small segments. (See FIGS. 14–17). As noted hereinabove, each side edge of each of both the large and small segments is chamfered to permit such mating engagement of these side edges. Specifically, each of the side edges 270 and 272 of each large segment is both chamfered and provided with a transverse groove 278,280 to thereby define an arcuate ledge 282,284 which extends substantially between the opposite ends 286,288 of the segment. Approximately midway between the opposite ends 286,288 of each of the grooves 278,280 there are provided outwardly opening slots 290,292, respectively, disposed in each of the side walls 294,296 of the grooves 278,280.

Each of the side edges 274 and 276 of each of the small segments of each set of segments, segment 32, for example, are similarly chamfered as indicated at 300,302 (see FIGS. 11–13 and 17A, 17B and 17C. Further, each of the side edges 274,276 of each small segment is provided with a transverse groove 304,306 to define arcuate ledges 308,310 which extend between the opposite ends 312,314 of the small segments. Approximately midway between the opposite ends of each of the arcuate ledges 308,310 of each of the small segments there is provided an alignment dowel 316, 318 which is designed to engage respective ones of the slots 290,292 in the mating side edges of neighboring large segments when the side edges of the large and small segment come together in mating relationship as the diameter of the drum is established. (See also FIGS. 17A and 17B) Further, each of the small segments is provided with first and second internally threaded bores 320 and 322, respectively, which are disposed generally adjacent respective ones of the opposite ends of each of the small segments and which extend from the surface 324 of the outer wall 326 of the groove 304, for example, fully through the thickness of the segment in a direction substantially normal to the planar wall 326 of the groove. Third and fourth internally threaded bores 328 and 330 are provided on each of the side edges of each small segment at respective locations adjacent respective ones of the ends of the chamfered surface 332 of each side edge of each small segment. Each of these third and fourth bores extends fully through the thickness of the segment from the surface 332 of the tongue 308 of the segment. Each of the first and second and fourth and fifth bores is designed to threadaby receive therein a flat point set screw 334,336 and 338,340 respectively, for example.

Figure 2:
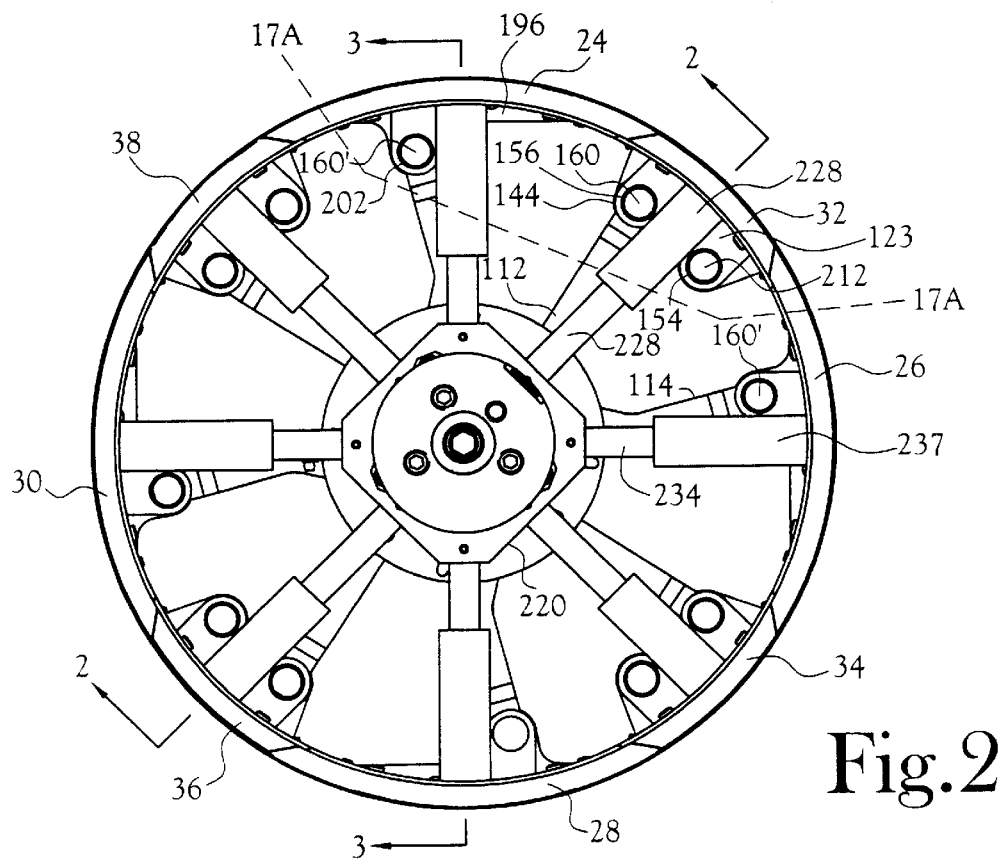
FIG. 2 is an planar end view of the the drum depicted in FIG. 1.
Figure 17A:
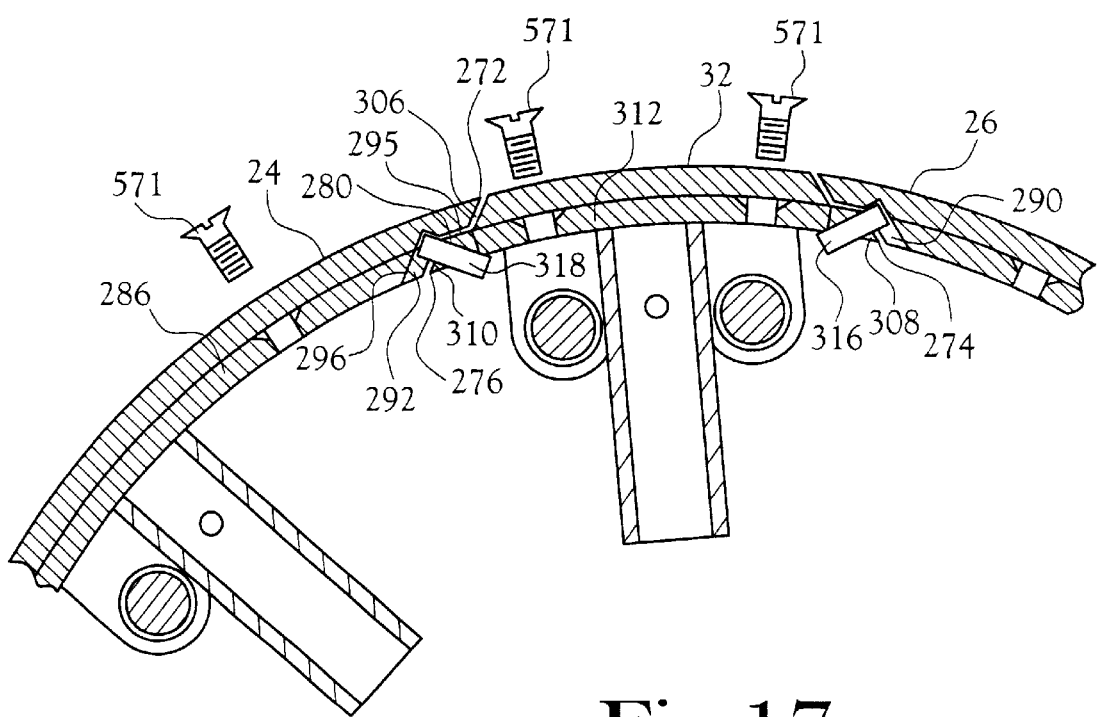
FIGS. 17A, 17B and 17C are sectional views taken generally along line 17A—17A of FIG. 2 and at various depths to depict the mating relationship of the side edges of small and large segments of the drum depicted in FIGS. 1 and 2.
Figure 17B:
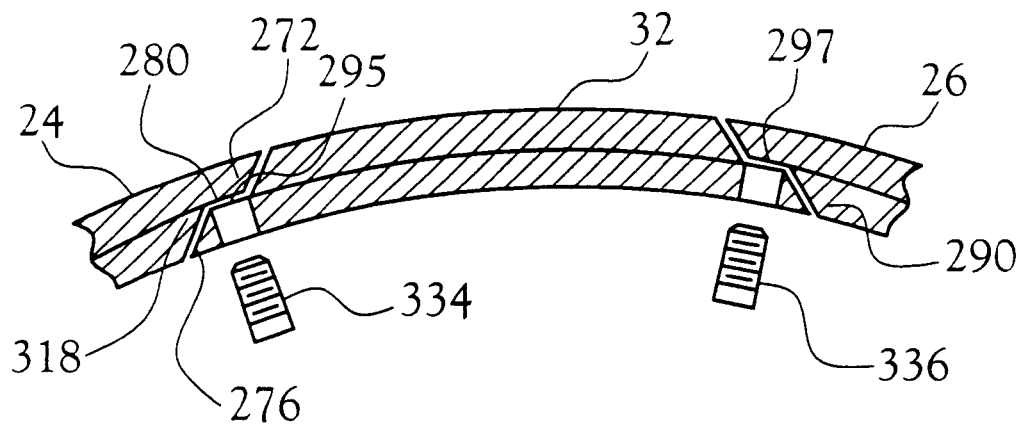
Figure 17C:
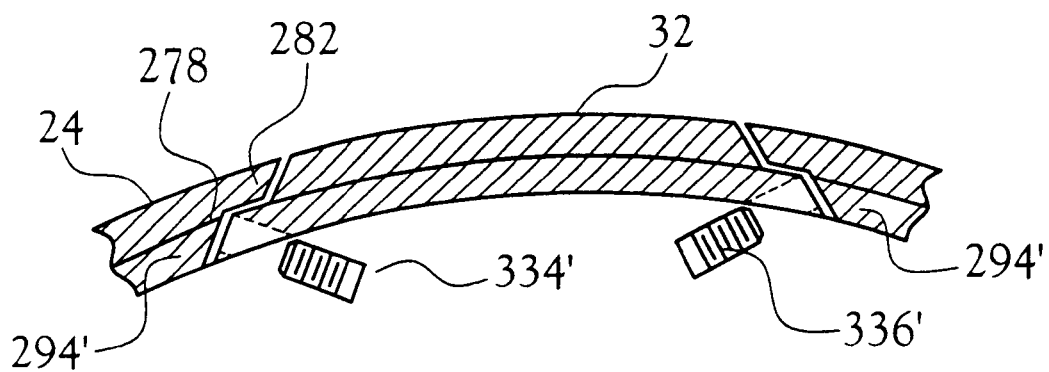

With reference to FIGS. 2,17A and 17B, when the side edge 270 of a large segment 24 matingly engages a respective side edge 276 of a neighboring small segment 32, as when the diameter of the drum is maximized to develop its designed maximum outer circumferential surface, the ledge 310 of the small segment is received with the groove 280 of the large segment and the dowel 318 projecting from the side wall of the groove 306 of the small segment is received within the slot 292 in the wall 296 of the groove 280 of the large segment, thereby establishing side-to-side alignment of these adjacent segments. As depicted in FIGS. 17A–17C, when the large and small segments are in mating engagement, the flat end of each of the set screws 334,334' of each small segment can engage the wall 295 of the mating large segment and the flat end of each of the third and fourth set screws 336,336', can engage the wall 297 of the groove 280. Thus, by adjusting the depth of penetration of each of the first, second, third and fourth set screws 334,336,338,and 340 within their respective internally threaded bores, the angularity of alignment of the mating segments and the relative radial positioning of the large segment with respect to its respective adjacent small segments may be adjusted. These degrees of alignment serve to more perfectly align the several segments and more perfectly define a true circumferential outer surface for the drum. In the present drum, these first, second, third and fourth set screws are readily accessible for a respective end of the drum for adjustment as needed over the operational life of the drum.

Figure 31:
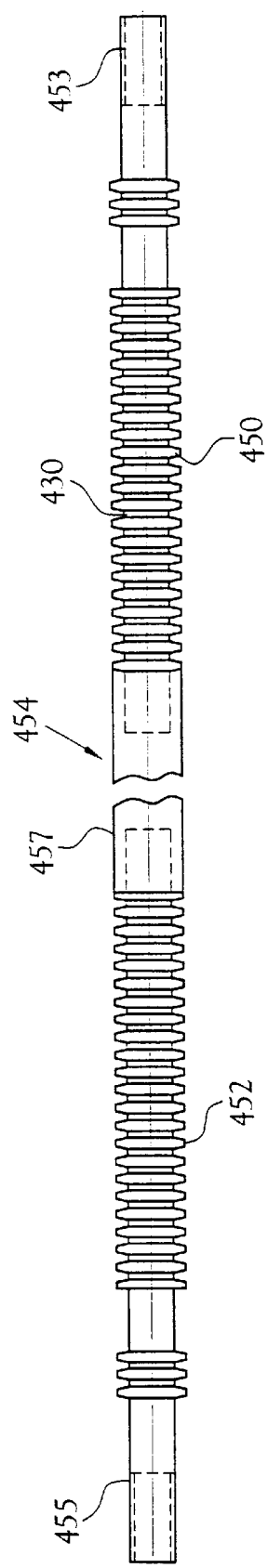
FIG. 31 is a side elevation view of a lead screw as employed in the drum of the present invention.
Figure 32:
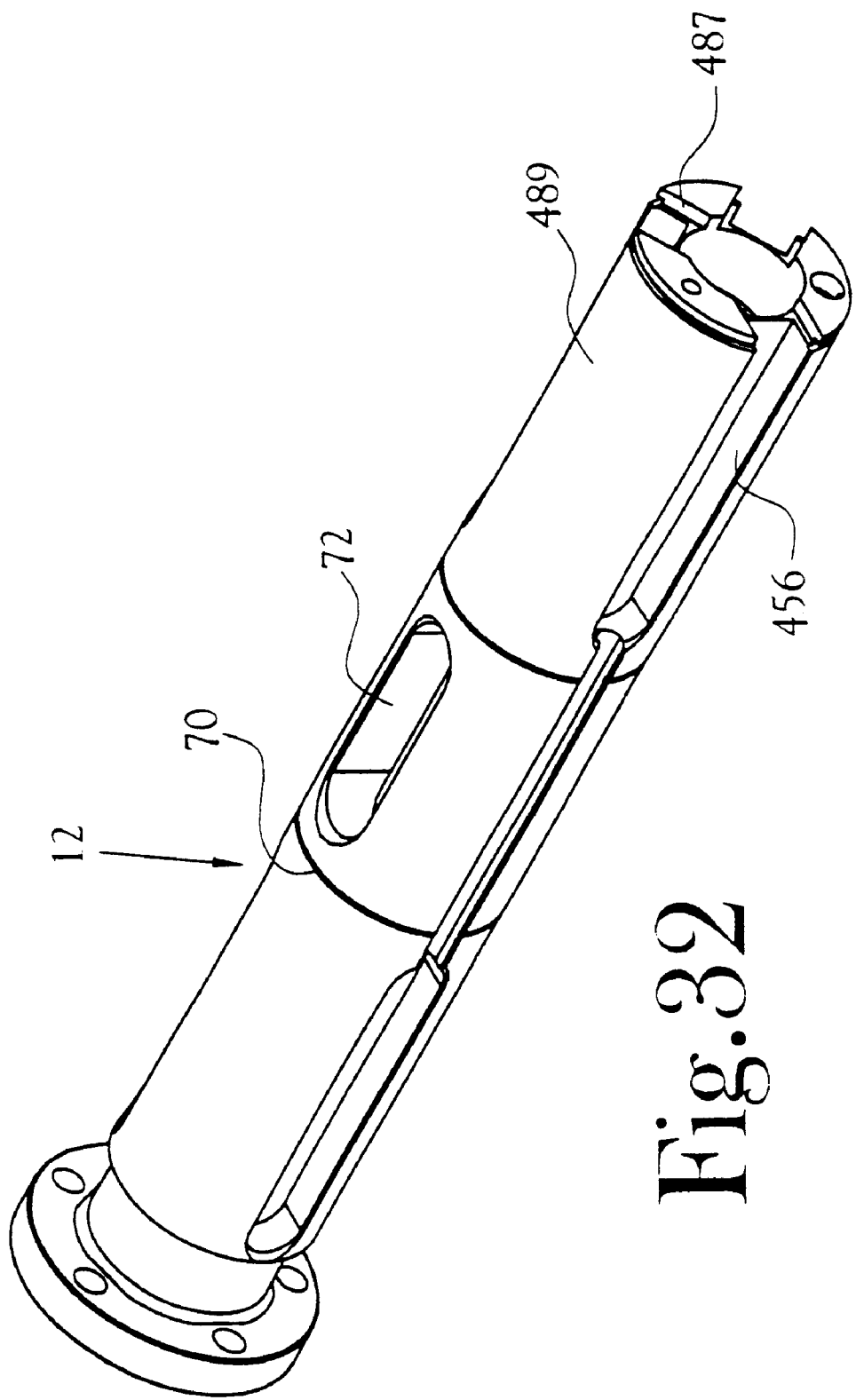
FIG. 32 is a perspective view of the main shaft of the drum depicted in FIG. 1.
Figure 33:
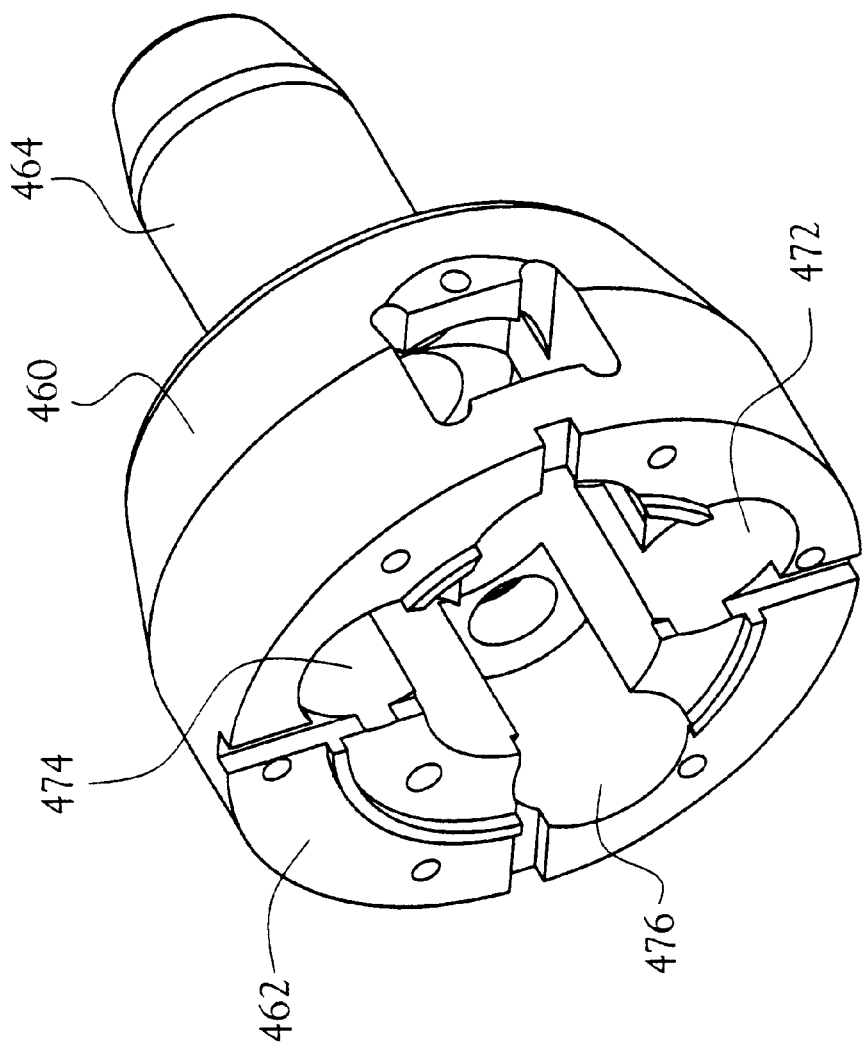
FIG. 33 is a perspective view of a housing employed to mount various of the elements employed in effecting and/or recording the axial positioning of the opposite sets of segments of the drum depicted in FIG. 1.
Figure 34:
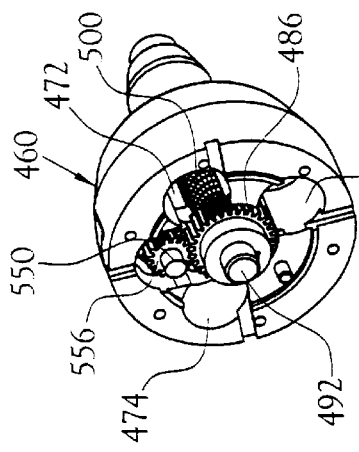
FIG. 34 is a further perspective view of the housing of FIG. 32 and including additional elements of the drum of the present invention.
Figure 36:
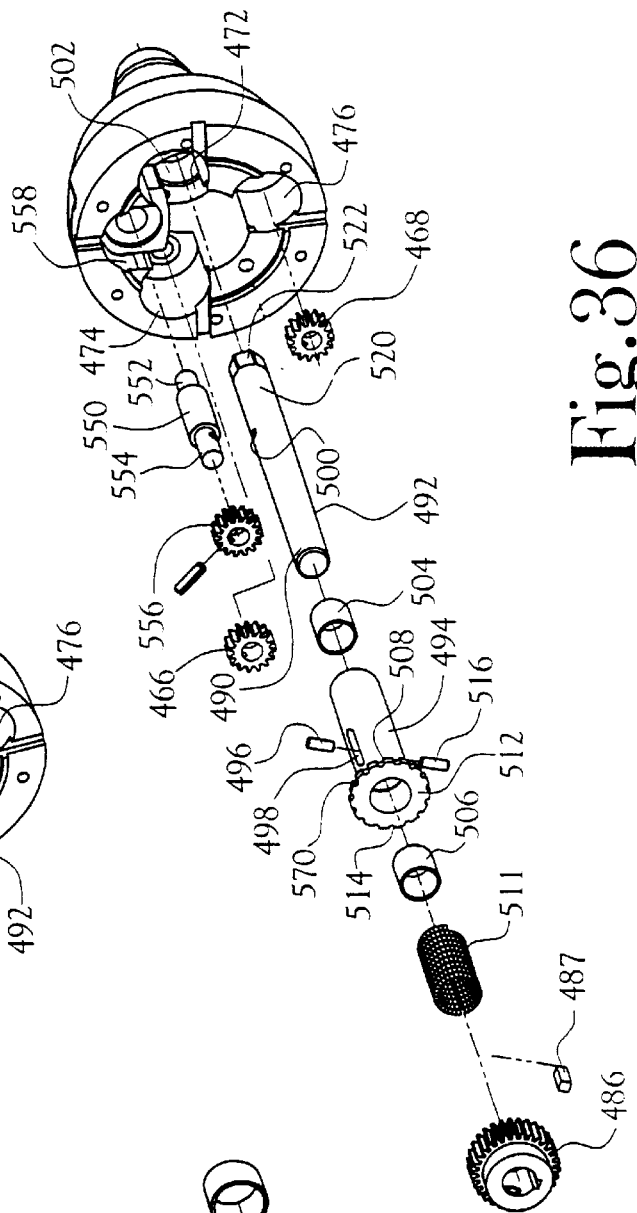
FIG. 36 is a further exploded view depicting the placement of additional drum elements within or associated with the housing of FIG. 33; and, FIG. 37 is an enlarged view of a portion of the left-hand end of the drum depicted in FIG. 3.
Figure 35:
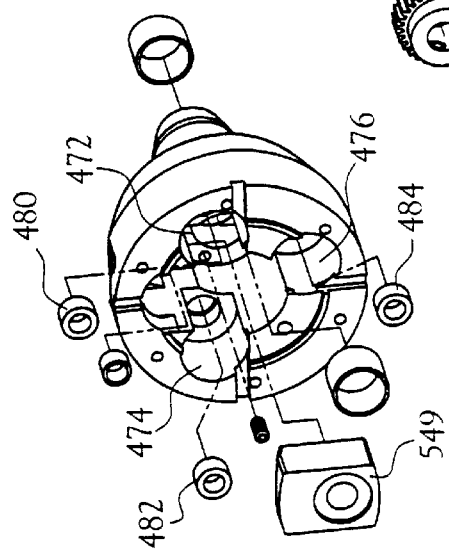
FIG. 35 is an exploded view depicting in the placement of various of the drum elements within the housing of FIG. 33.

In the depicted embodiment of the present drum, each of the collars 220 and 222 includes a plurality, three in the depicted embodiment, of arcuate sections 400,402 and 404 which are disposed with their ends adjacent to one another to define a first discontinuous hollow cylinder indicated generally by the numeral 406 mounted on the outboard face 408 of the collar and encircling the main shaft 12. A locking ring 411 and screws 413 serve to secure the arcuate sections 400,402,404 to the face 408 of the collar 220. Between the adjacent ends of the arcuate sections, first, second and third mounting blocks 410,412 and 414, respectively are anchored to the outboard face 408 of the collar as by bolts 416,418 and 420, respectively, which extend through one end of their respective blocks and threadably engage the collar 220. The opposite end of each block projects radially inwardly of the discontinuous cylinder 406 and is provided with an internally threaded through bore 424 whose axis 426 is oriented parallel to the main shaft 12. In the depicted embodiment there are provided three such blocks which are spaced apart from one another in the discontinuities of the discontinuous hollow cylinder 406. Each of the internally threaded through bores of a block is designed to threadably receive therein an internally threaded lead nut 449 (typical). Each lead nut (449 typical) threadably receives therethrough one of first, second and third externally threaded lead screws 430,432,434, (see FIGS. 6,10 and 31)

A second and similar, discontinuous, open hollow cylinder 436 is affixed to the outboard surface of the second collar 222 as by means of a locking ring 438 which is disposed in abutting relationship to the hollow cylinder and anchored to the outboard face 440 of the collar as by bolts 442. As in the first hollow cylinder, within the discontinuities of the hollow cylinder there are mounted fourth, fifth and sixth mounting blocks 444,446 and 448. (see FIGS. 6 and 10), respectively. Each mounting block is provided with an internally threaded lead nut 449, (typical) which is indicated to the lead nuts 449 of the blocks 410,412,414 except being of opposite handed internal threads. The respective axes of the lead nuts 449 and 449, are in axial register. One end of one of the first, second and third composite lead screws is threadably received within each pair of requested lead nuts. As depicted, each lead screw 430 (typical) is provided with left hand threads 450 on one of its ends 453 and right hand threads 452 on its opposite end 455. Each lead screw 430 is a composite of the left hand threaded end and right hand threaded end joined together by a central tubular connector 454 having a smooth outer circumferential surface 457 which is disposed between the inner circumference of the hub 52 and the main shaft 12. Preferably, each lead screw lies within a respective one of first, second and third outwardly opening grooves 456,458 (only the first and second grooves are depicted in the Figures) that are provided along the length of, and on the outer circumferential surface of, the main shaft. It will be recognized that rotation of the several lead screws simultaneously will effect axial movement of the collars 220 and 222, along with their respective set of segments, toward or away from one another, depending upon the direction of rotation of the lead screws, thereby providing for axial positioning of the respective sets of segments.

Outboard of the locking ring 411 on the end 489 of the main shaft there is provided a subassembly for effecting axial adjustment of the width of the drum by effecting simultaneous, directionally selective, rotation of the first, second and third lead screws 430,432,434. Referring specifically to FIGS. 6,10 and 32–36, this subassembly includes a bell-shaped housing 460 comprising a generally cavitated body portion 462 and an elongated hollow tubular portion 464.

As best depicted in FIGS. 3,4 and 33–36, within the interior of the cavitated body portion of the housing there are received first, second and third spur gears 466,468 and 470, respectively which are spaced apart circumferentially of the housing and within respective cavities 472,474 and 476. As depicted in FIG. 6, each of these spur gears is fixedly mounted on one end of a respective one of the lead screws by means of a conventional expanding locking nut 478 (typical) (FIG. 6). Outboard of the locking nut, there is provided a thrust washer whose outer circumference fits within a sub-cavity within respective ones of the cavities 472,474,476 (see FIG. 35) which receive the spur gears 466,468,470 and serve to rotatably mount the end of the lead screws 430,432,434 within the housing 460. One end of each of the first, second and third lead screws is likewise rotatably mounted within their respective cavities (not shown) within the housing. Stabilization of those ends of the lead screws adjacent the housing 460 is enhanced by means of respective pillow blocks 485 (typical) (FIG. 6) that are received in respective radially outwardly opening slots 487 in the end 489 of the main shaft 12. The lead screws thus extend so axially away from the housing and along substantially the length of the main shaft and within their respective groove in the outer circumference of the main shaft. Thus, the lead screws and the housing rotate in unison with rotation of the main shaft.

As depicted, a fourth spur gear 486 is mounted centrally of and in meshing relationship with the first, second and third spur gears 486,468 and 470. This fourth spur gear 486 is keyed 487 on one end 490 of an adjustment pin 492 which is mounted within a flanged sleeve 494 which is pinned 496 through a slot 498 in the sleeve that is in register with a bore 500 in the adjustment pin 492 to the adjustment pin to limit axial and rotational movement of the sleeve relative to the adjustment pin. In turn, the sleeve is rotatably and slidably received within a central bore 502 of the hollow tubular portion of the housing. Bushings 504 and 506 are provided in encircling relationship to the adjustment pin 492 and within the annular space between the outer circumference of the adjustment pin and the outer circumference of the sleeve to slidably mount the adjustment pin within the sleeve to the extent permitted by the length of the slot 498. When the sleeve and adjustment pin are assembled together and disposed within the housing, the outboard surface 508 of the flange 510 abuts the inboard end of the central bore 502 of the tubular portion of the housing as seen in FIGS. 3 and 4. A coiled spring 511 is interposed between the spur gear 486 which is fixedly mounted on the end of the alignment pin, and the inboard surface 512 of the flange 510 and serves to bias the sleeve 494, hence the adjustment pin 492, axially outwardly of the drum. The outer circumferential surface 514 of the flange is provided with notches equally spaced apart about such outer circumferential surface of the flange. A conventional spring pin 516 is countersunk into a cavity within the housing 460 with its outboard end disposed in locking engagement with one of the notches in the sleeve flange when the flange is in abutting relationship to the inboard end of the central bore 502 of the tubular portion 464 of the housing, 460 thereby locking the sleeve against rotation within the housing. On the other hand, when the sleeve and its flange (and the adjustment pin affixed thereto) are forced axially inwardly of the drum against the biasing force of the coiled spring, the flange no longer is in contact with the spring pin 516 and the sleeve is therefore free to be rotated with respect to the housing.

Rotation of the adjustment pin 492, produces rotation of the fourth spur gear 486 which is keyed to the end of the alignment pin. As will be recognized, rotation of the fourth spur gear 486 functions to simultaneously rotate the first, second and third spur gears 466,468,472 whose gear teeth mesh with the gear teeth of the fourth spur gear 486. It will be further recognized that rotation of the first, second and third spur gears functions to simultaneously rotate the first, second and third lead screws 430,432,434 and that rotation of the lead screws within the lead nuts held within their respective mounting blocks associated with the first and second collars functions to move the collars axially of the main shaft. Depending upon the direction of rotation of the lead screws, the collars, and their associated segments, move toward or away from the transverse center plane of the drum simultaneously and coextensively. As the segments of the drum are moved axially, their respective mounting lugs 240,259 slide along the rods 160 which extend from the central portion of the drum and in opposite directions from the transverse center plane of the drum.

Rotation of the fourth spur gear is effected in the depicted embodiment by accessing the outboard end 520 of the adjustment pin 492 and rotating this pin. To this end, the outboard end 520 of the adjustment pin is configured 522 to receive thereon a conventional socket wrench by means of which the sleeve can be pushed axially inwardly of the drum against the bias of the spring 511 to free the flanged sleeve and the adjustment pin which is pinned to the sleeve for rotation thereof. By reason of the pinned relationship between the adjustment pin and the fourth spur gear 486, rotation of the adjustment pin effects rotation of the first, second and third spur gears 466,468,470, hence simultaneous and coextensive rotation of the first, second and third lead screws 430,432,434. As noted, rotation of the lead screws within their respective lead nuts 449 results in axial movement of the first and second collars 220,222 in opposite directions. Depending upon the direction of rotation of the lead screws, the movement of the collars is either axially toward or away from the transverse center plane of the drum. This axial movement of the collars, hence the respective sets of segments, is accommodated and stabilized by reason of the sliding nature of the mounting lugs 240 and 259 on the respective rods 160. Inasmuch as each of the collars 220, 222 is non-rotational with respect to the main shaft, the relative circumferential alignment of the several segments of each set of segments is maintained over the course of the axial movement of the collars. Because the left-hand segments and their corresponding right-hand segments are commonly mounted on a respective rod 160, these left and right-hand segments maintain their positions relative to one another.

Recalling that the several rods 160 are themselves mounted for radial movement thereof relative to the rotational axis of the drum, the axial movement of the sets of segments can take place independently of, or simultaneously with, radial movement of the segments.

As best seen in FIGS. 3,4 and 6, the hollow end 489 of the main shaft 12 is internally threaded and receives therein an elongated tubular sleeve 530 which is externally threaded at its outboard end 532 to be threadably received within the hollow end 489 of the main shaft. The outboard end of the sleeve terminates in the form of an annular flange 534 whose outer circumference slidably engages the inner circumference of the hollow main shaft adjacent the open end 489 of the shaft. This sleeve further is provided with an annular shoulder 536 at a location inwardly from its open outboard end. A portion 538 of the internal diameter of the sleeve adjacent the shoulder is internally threaded. As best seen in FIGS. 3 and 4, a conventional elongated deceleration member 542 is fitted within the sleeve 530 and includes an externally threaded axial projection 544 on that end thereof adjacent the shoulder 536 of the sleeve and an axially movable piston rod 546 extending axially from the deceleration member toward and abut this the flat end surface 548 of the inboard end 550 of the drive rod 90. The externally threaded projection 544 on the outboard end of the deceleration member is threaded into the internal threads of the sleeve 530 to fixedly secure the deceleration member within the sleeve. The outboard open end of the sleeve receives therein the bushing 504, which in turn slidably receives therein the end of the adjustment pin 492. The extent of permissible insertion of the end of the adjustment pin into the bushing is limited by reason of the end of the bushing engaging face of the fourth spur gear 486, the deceleration member being thereby fixedly mounted within the hollow main shaft with its piston rod element 548 being disposed adjacent the end of the drive rod 90. Upon axial movement of the drive rod 90 to the left as viewed in FIG. 32, it will be recognized that the deceleration member serves to dampen such axial movement of the drive rod 90. This feature of the present invention has been found to materially reduce the noise associated with the metal-to-metal contacts between the drive rod, its associated roller cams 80,82, the engagement of the cams with the helical slots 74,76 in the hub 52, and the associated mechanical movements which move the segments radially inwardly and outwardly of the drum. This feature further prolongs the life of the drum by reducing the severity of the metal-to-metal engagements which occur in the course of operation of the drum.

In one embodiment of the present drum, there is provided a counter 549 mounted in the housing 460. (See FIGS. 32 and 35–36). This counter is driven by rotation of a shaft 550, one end 552 of which is operatively connected to the counter and the opposite end 554 of which has fixedly mounted thereon a fifth spur gear 556. This spur gear is mounted within a cavity 558 in the interior of the housing 460 such that its gear teeth mesh with the gear teeth of the central fourth spur gear 486 so that rotation of the fourth spur gear 486 is translated into a numerical output by the counter. Thus, through the means of this counter subassembly, the operator can at all times obtain a visual indication of the relative axial positions of the two sets of segments.

As desired, the tubular portion of the housing 460 may serve as the location for mounting of the drum in the tailstock end (not shown) of a tire making machine as is well known in the art.

Whereas the present invention has been described employing specific mechanical elements, one skilled in the art will recognize other equivalent elements which may be employed without adversely affecting the functionality of the present drum.

What is claimed:

1. A rotatable drum useful in the manufacture of vehicle tires and having a main shaft defining a rotational axis of the drum comprising a plurality of segments collectively defining the outer circumferential surface of the drum, said segments being divided into first and second sets of segments, one set of segments being disposed on each of the opposite sides of the transverse center plane of the drum, a central control mechanism controlling the radial positions of all the segments simultaneously and equidistantly from the rotational axis of the drum, while permitting axial movement of the two sets of segments relative to one another while the segments are positioned at any given radial location of the segments, said central mechanism including means interconnecting said segments of said sets of segments for movement of the plurality of segments of each of the two sets of segments radially of the rotational axis of the drum as slaves of the central mechanism, whereby said segments are selectively positionable between expanded positions radially of the rotational axis of the drum to provide a substantially continuous circumferential outer surface of the drum for the layup of a tire carcass thereon, and collapsed positions radially of the drum to permit the removal of a formed toroidal carcass from the drum, means mounting said segments of each set of segments for selective positioning thereof axially of the drum from a location external of the drum to adjust the overall working width of the drum, said means including multiple lead screws associated with the main shaft of the drum and actuatable simultaneously from a single location external of the drum to effect adjustment of the width of the drum, with disengagement of the lead screws from the external source of their adjustment once the width of the drum is selectively established, thereby ensuring locking of the drum width against unintended change thereof.

2. The drum of claim 1 and including a plurality of gap shields disposed about the outer circumferential surface of the drum at respective locations intermediate the opposite ends of the drum.

3. The drum of claim 1 wherein each of said lead screws includes a spur gear secured to one end thereof and a further spur gear disposed centrally of said spur gears secured to said lead screws, the teeth of each of said spur gears meshing with the teeth of said further spur gear whereby rotation of said further spur gear functions to simultaneously rotate said spur gears of said lead screws by equal amounts.

4. The drum of claim 3 wherein all of said spur gears are disposed interiorly of the drum and including an adjustment pin leading from said further spur gear to the exterior of the drum whereby rotation of the adjustment pin functions to rotate said further spur gear.

5. The drum of claim 4 and including means for locking said adjustment pin against unintended rotation thereof.

6. The drum of claim 1 wherein said means mounting said segments of first and second set of segments for axial positioning of the segments includes first and second collars, said first collar being associated with a respective set of segments, each of said collars encircling the main shaft adjacent a respective end of the main shaft, the main shaft being rotatable within each collar, with each collar being non-rotatable and non-moveable axially relative to the main shaft, at least one rigid mounting rod extending between said first collar and each of said segments of said first set of segments, at least one rigid mounting rod extending between said second collar and each of said segments of said second set of segments, a tubular projection having an open end and extending radially inwardly of the drum to slidably receive in said open end thereof an end of a mounting rod to mount each segment for movement radially inwardly or outwardly with respect to the rotational axis of the drum, at least on lead nut fixedly mounted to each collar, and at least one lead screw extending between said first and second collars and being threadably received within said lead nuts, said lead screw having opposite handed threads on opposite sides of the transverse center plane of the drum whereby rotation of said lead screw effects axial simultaneous and equidistant sliding movement of said first and second collars along the main shaft to thereby selectively adjust the working width of the drum.

7. The drum of claim 6 and including means operatively connecting said lead screw to an adjustment pin which is accessible exteriorly of the drum.

8. The drum of claim 6 and including a plurality of lead screws threadably received through respective lead nuts mounted on said first and second collars, each of said lead screws including a gear affixed to one end thereof, a further gear affixed to said adjustment pin, said gears affixed to said lead screws being disposed about and in driven juxtaposition to said further gear whereby rotation of said further gear effects rotation of said justapositioned gears and their respective lead screws.

9. The drum of claim 6 wherein said adjustment pin extends from said further gear to a location externally of the drum.

10. The drum of claim 9 and including a housing disposed adjacent one end of the drum and containing therein said gears affixed to said lead screws and said further gear and said adjustment pin, and further including sleeve means rotatably mounted in said housing and receiving said adjustment pin therethrough and mounting said adjustment pin non-rotatably and with limited axial moveablitity within said sleeve, said sleeve means including an annular flange having an outer circumferential surface on which there are defined spaced apart indentations, and spring pin means mounted in said housing in operative proximity to said indentations to engage the same to limit the rotation of said sleeve within said housing, hence limit the rotation of said adjustment pin within said sleeve when said spring pin is in engagement with one of said indentations, and further including means biasing said sleeve means toward a position wherein said spring pin is in engagement with one of said indentations.

11. The drum of claim 10 wherein said sleeve projects externally of said housing and in position to be urged axially inwardly of the drum to overcome said biasing means and move said annular flange axially away from said spring pin such that said sleeve can be rotated with rotation of said adjustment pin.

\* \* \* \* \*